US010981299B2

(12) United States Patent
Patrick et al.

(10) Patent No.: US 10,981,299 B2
(45) Date of Patent: *Apr. 20, 2021

(54) STRUCTURAL COMPLEX MOLD

(71) Applicant: Shark Wheel, Inc., Lake Forest, CA (US)

(72) Inventors: Robert Patrick, Plano, TX (US); Pedro Valdez, Mission Viejo, CA (US); David Patrick, Ladera Ranch, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/931,881

(22) Filed: Jul. 17, 2020

(65) Prior Publication Data

US 2020/0346371 A1    Nov. 5, 2020

Related U.S. Application Data

(63) Continuation-in-part of application No. 14/454,591, filed on Aug. 7, 2014, now Pat. No. 10,773,424.

(51) Int. Cl.
| | |
|---|---|
| *B29C 33/00* | (2006.01) |
| *B29C 33/42* | (2006.01) |
| *B29C 33/44* | (2006.01) |

(52) U.S. Cl.
CPC .......... *B29C 33/0061* (2013.01); *B29C 33/42* (2013.01); *B29C 33/44* (2013.01)

(58) Field of Classification Search
CPC ... A63C 17/223; A63C 17/22; B29C 33/0061; B29C 33/44; B29C 33/42
See application file for complete search history.

(56) References Cited

U.S. PATENT DOCUMENTS

| | | | | |
|---|---|---|---|---|
| 1,895,093 A | * | 1/1933 | Carlson ................ | A63C 17/22 301/5.7 |
| 2,485,304 A | * | 10/1949 | Marsh .................. | A63C 17/22 301/5.309 |
| 2,599,540 A | * | 6/1952 | Brown .................. | A63C 17/22 301/5.7 |
| 2,687,260 A | * | 8/1954 | Morin .................. | B65H 75/18 242/118.7 |
| 3,498,363 A | * | 3/1970 | Spindler .............. | B22D 19/085 164/112 |
| 4,040,670 A | | 8/1977 | Williams | |

(Continued)

*Primary Examiner* — Xiao S Zhao
*Assistant Examiner* — Emmanuel S Luk
(74) *Attorney, Agent, or Firm* — CIONCA IP Law P C.; Marin Cionca

(57) ABSTRACT

A mold for molding an object having a shape, the mold comprising: a top, middle, and bottom bodies, said bodies having peripheral walls, and defining a central vertical axis and an inside cavity surface having same central vertical axis, when said bodies are in mutual contact; and a center hole disposed centrally in a top surface of the top body, the center hole aligning with the vertical central axis; the middle body comprising separate halves that are identical in shape; wherein the inside cavity surface comprises at least one protrusion disposed horizontally along the inside cavity surface, and at least one channel disposed horizontally along the inside cavity surface, the at least one channel being adjacent to the at least one protrusion; wherein, in the presence of a molding compound, the inside cavity surface defines at least a portion of the shape of the object being molded within the mold.

19 Claims, 19 Drawing Sheets

(56) References Cited

U.S. PATENT DOCUMENTS

| | | | |
|---|---|---|---|
| 4,133,371 A | | 1/1979 | Birch |
| 4,243,199 A | * | 1/1981 | Hill ........................ B29C 39/34 |
| | | | 249/142 |
| 4,699,432 A | * | 10/1987 | Klamer .................. A63C 17/22 |
| | | | 152/210 |
| 5,076,760 A | * | 12/1991 | Weetman ............ B29C 45/0005 |
| | | | 416/204 R |
| 5,312,844 A | | 5/1994 | Gonsior |
| 5,531,949 A | | 7/1996 | Heitfiled |
| 5,630,891 A | | 5/1997 | Peterson |
| 6,102,091 A | * | 8/2000 | Peterson .............. A63C 17/223 |
| | | | 152/165 |
| 8,899,967 B2 | | 12/2014 | Vannarsdall |
| 2002/0014133 A1 | * | 2/2002 | Kimizuka ................ F16H 55/17 |
| | | | 74/460 |
| 2009/0127745 A1 | * | 5/2009 | Renzo .................. B29C 33/304 |
| | | | 264/334 |
| 2013/0337104 A1 | | 12/2013 | Vannarsdall |
| 2016/0243311 A1 | * | 8/2016 | Fournier ........... A61M 5/31513 |

\* cited by examiner

STRUCTURAL COMPLEX MOLD

CROSS-REFERENCE TO RELATED APPLICATIONS

This application is a continuation-in-part of and claims the benefit of U.S. Non-Provisional application Ser. No. 14/454,591, filed Aug. 7, 2014, which is hereby incorporated by reference, to the extent that it is not conflicting with the present application.

BACKGROUND OF INVENTION

1. Field of the Invention

The invention relates generally to molds and methods of molding.

2. Description of the Related Art

Molding is a manufacturing process where liquid or pliable raw material is introduced into a rigid frame called a mold or matrix. Materials that lend themselves to a molding process include plastic, glass, metal, ceramic and others. The liquid hardens or sets inside the mold, adopting the mold's interior surface conformation. The common bi-valve molding process uses two mold portions, one for each half of an object. A release agent may be used to make removal of the molded object from the mold easier. When an object has a complex shape, that is, with protrusions and depressions in more than one direction in 3D-space, it may be impossible to remove the finished part from a simple mold.

Therefore, there is a need to solve the problems described above by providing a mold for molding of certain types of complex parts.

The aspects or the problems and the associated solutions presented in this section could be or could have been pursued; they are not necessarily approaches that have been previously conceived or pursued. Therefore, unless otherwise indicated, it should not be assumed that any of the approaches presented in this section qualify as prior art merely by virtue of their presence in this section of the application.

BRIEF INVENTION SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In an aspect, a mold having an upper, medial, and lower bodies is provided, the upper, medial, and lower bodies forming a composite peripheral wall. The upper, medial, and lower bodies may define an inside cavity which may have a complex shape, the inside cavity comprising circular protrusions, circular depressions, and axially aligned central cylinders. Pour holes are provided in the upper body for introducing a molding compound into the mold while allowing air to exit the inside cavity. The medial body may comprise multiple portions, particularly two halves that may be sealed together. The upper body may be axially lifted off the medial body and the medial body may be separated into its multiple portions, such that the medial body is laterally moved away from the molded object, which enables removal of the complex molded part. Thus, due to the minimal number of mold components, an advantage is an improvement in manufacturing time and therefore a reduction in manufacturing costs. An additional advantage is that, compared to current demolding methods, because less time may be spent demolding the molded object, manufacturing costs may be reduced.

In another aspect, a mold for molding an object having a complex shape is provided. The mold may comprise: a top, middle, and bottom bodies, said bodies having peripheral walls, and defining a vertical central axis and an inside cavity surface having same vertical central axis, when said bodies are in mutual contact; and a center rod adapted to be attached to a center of the bottom body, the center rod extending from the center up through a center hole in the top body, and aligning with the vertical central axis, when attached. The inside cavity surface may comprise a plurality of protrusions disposed horizontally along a medial portion of the inside cavity surface, and a plurality of channels disposed horizontally along the medial portion, wherein the plurality of protrusions and the plurality of channels are each wave-shaped. The mold being thus configured wherein, in the presence of a molding compound, the inside cavity surface defines the complex shape of the single object being molded within the mold. Thus, due to the minimal number of mold components, an advantage is an improvement in manufacturing time and therefore a reduction in manufacturing costs. An additional advantage is that, compared to current demolding methods, because less time may be spent demolding the molded object, manufacturing costs may be reduced. Another advantage is that the flexibility of the placement of the mold structures may allow for a nearly error-free molding process, and thus an increase in molding efficiency.

In another aspect, a mold for molding a single object having a complex shape is provided. The mold may comprise: a top, middle, and bottom bodies, said bodies having peripheral walls, and defining a vertical central axis and an inside cavity surface having same vertical central axis, when said bodies are in mutual contact; and at least one axially aligned cylinder disposed centrally within the top body, the at least one axially aligned cylinder comprising a center hole, and aligning with the vertical central axis. The inside cavity surface may comprise a first plurality of depressions disposed vertically in an upper portion of the inside cavity surface, at least one protrusion disposed horizontally along a medial portion of the inside cavity surface, at least one channel disposed horizontally along the medial portion, and a second plurality of depressions disposed vertically in a lower portion of the inside cavity surface, wherein the at least one protrusion and the at least one channel are wave-shaped. The mold being thus configured wherein, in the presence of a molding compound, the inside cavity surface defines the complex shape of the single object being molded within the mold. Thus, due to the minimal number of mold components, an advantage is an improvement in manufacturing time and therefore a reduction in manufacturing costs. An additional advantage is that, compared to current demolding methods, because less time may be spent demolding the molded object, manufacturing costs may be reduced. Another advantage is that the flexibility of the placement of the mold structures may allow for a nearly error-free molding process, and thus an increase in molding efficiency.

In another aspect, a mold is provided comprising: a top, middle, and bottom bodies, said bodies having peripheral walls, and defining a vertical central axis, when said bodies are in mutual contact; the middle body comprising two separate halves that are identical in shape, and which, when abutted, form an inside cavity surface having same vertical central axis. The inside cavity surface may comprise at least one protrusion disposed horizontally along the inside cavity surface, and at least one channel disposed horizontally along the inside cavity surface, the at least one channel being adjacent to the at least one protrusion. The mold being thus configured wherein, in the presence of a molding compound, the inside cavity surface defines at least a portion of a shape of an object being molded within the mold. Thus, due to the minimal number of mold components, an advantage is an improvement in manufacturing time and therefore a reduction in manufacturing costs. An additional advantage is that, compared to current demolding methods, because less time may be spent demolding the molded object, manufacturing costs may be reduced. Another advantage is that the flexibility of the placement of the mold structures may allow for a nearly error-free molding process, and thus an increase in molding efficiency.

The above aspects or examples and advantages, as well as other aspects or examples and advantages, will become apparent from the ensuing description and accompanying drawings.

BRIEF DESCRIPTION OF THE DRAWINGS

For exemplification purposes, and not for limitation purposes, aspects, embodiments or examples of the invention are illustrated in the figures of the accompanying drawings, in which.

DETAILED DESCRIPTION

Figure 1:
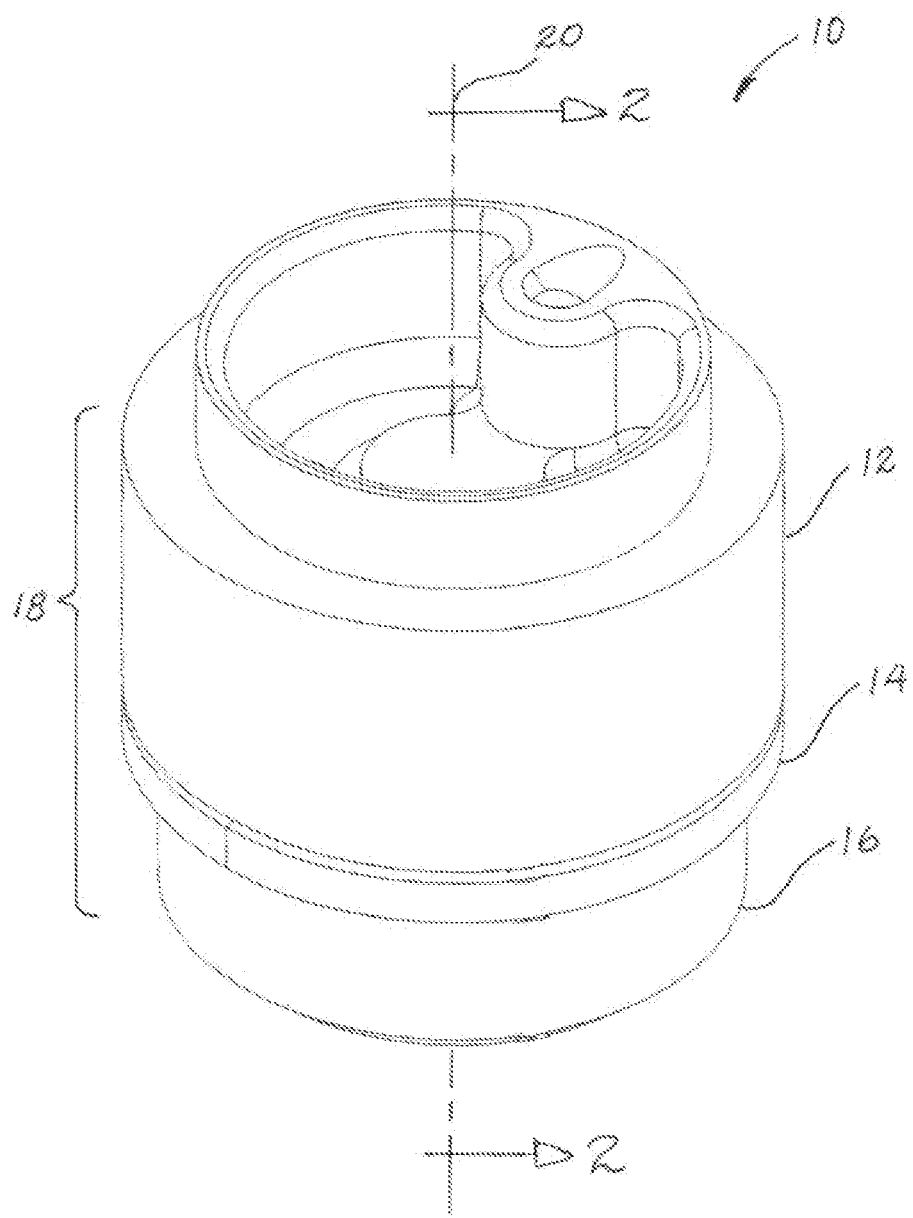
FIG. 1 illustrates an example top perspective view of an exterior of embodiments of a presently disclosed mold having upper, medial, and lower body portions, according to an aspect.

What follows is a description of various aspects, embodiments and/or examples in which the invention may be practiced. Reference will be made to the attached drawings, and the information included in the drawings is part of this detailed description. The aspects, embodiments and/or examples described herein are presented for exemplification purposes, and not for limitation purposes. It should be understood that structural and/or logical modifications could be made by someone of ordinary skills in the art without departing from the scope of the invention. Therefore, the scope of the invention is defined by the accompanying claims and their equivalents.

It should be understood that, for clarity of the drawings and of the specification, some or all details about some structural components or steps that are known in the art are not shown or described if they are not necessary for the invention to be understood by one of ordinary skills in the art.

For the following description, it can be assumed that most correspondingly labeled elements across the figures (e.g., 16, 616 etc.) possess the same characteristics and are subject to the same structure and function. If there is a difference between correspondingly labeled elements that is not pointed out, and this difference results in a non-corresponding structure or function of an element for a particular embodiment, example or aspect, then the conflicting description given for that particular embodiment, example or aspect shall govern.

When molding complex shaped objects, a mold must separate in at least two directions in 3D-space. Such molds may have a plurality of separable parts which may be held together with relatively complex interlocking hardware, clamps, and so forth. Such molds may be expensive to manufacture and expensive to use as assembly and disassembly may be time consuming. The presently described and illustrated apparatus, see e.g., FIGS. 1-5, is a mold 10 for molding complex objects by the well-known pour and cure method. Mold 10 is quickly assembled and disassembled and self-constraining, as an advantage. Another problem that may arise in static molding is that the moldate (the material that is cured to form the molded object) may tend to expand during the curing process. Therefore, the mold must have reinforcement to prevent mold cracking and bursting. Various embodiments of the mold 10 have such features as will be described in the following.

In embodiments, mold 10 may have an upper 12, medial 14, and lower 16 structural bodies each of which may be made of a rigid material such as steel or other metal, or of an engineering polymer, composite, or other rigid material. Bodies 12, 14, and 16, may have a composite peripheral wall 18 concentric or symmetrical about a vertical central axis 20 and may, by their respective shapes, define an inside cavity surface 30. Inside cavity surface 30 may define at least one circular protrusion 32, at least one circular depression or channel 34, and at least one axially aligned cylinder 36, all of which are clearly shown in FIGS. 2-4, as an example. Clearly, other shapes may be used for molding other objects. The at least one circular protrusion 32 may be sinewave-shaped and may comprise at least two adjacent said circular protrusions 32 as shown. The at least one circular depression 34 may be sinewave-shaped as well and may comprise at least two spaced-apart circular depressions 34, as shown. The at least one axially aligned cylinder 36 may include two axially spaced apart and axially aligned cylinders 36, as shown. The two spaced apart cylinders 36 may have mutually facing and axially aligned central holes 37, which may be used to form a bore hole for a central axle of a molded object such as a wheel. These aspects of surface 30 define an object that may be molded within mold 10, but other objects or modifications to the current surface 30 and current object may be made alternatively.

Figure 2:
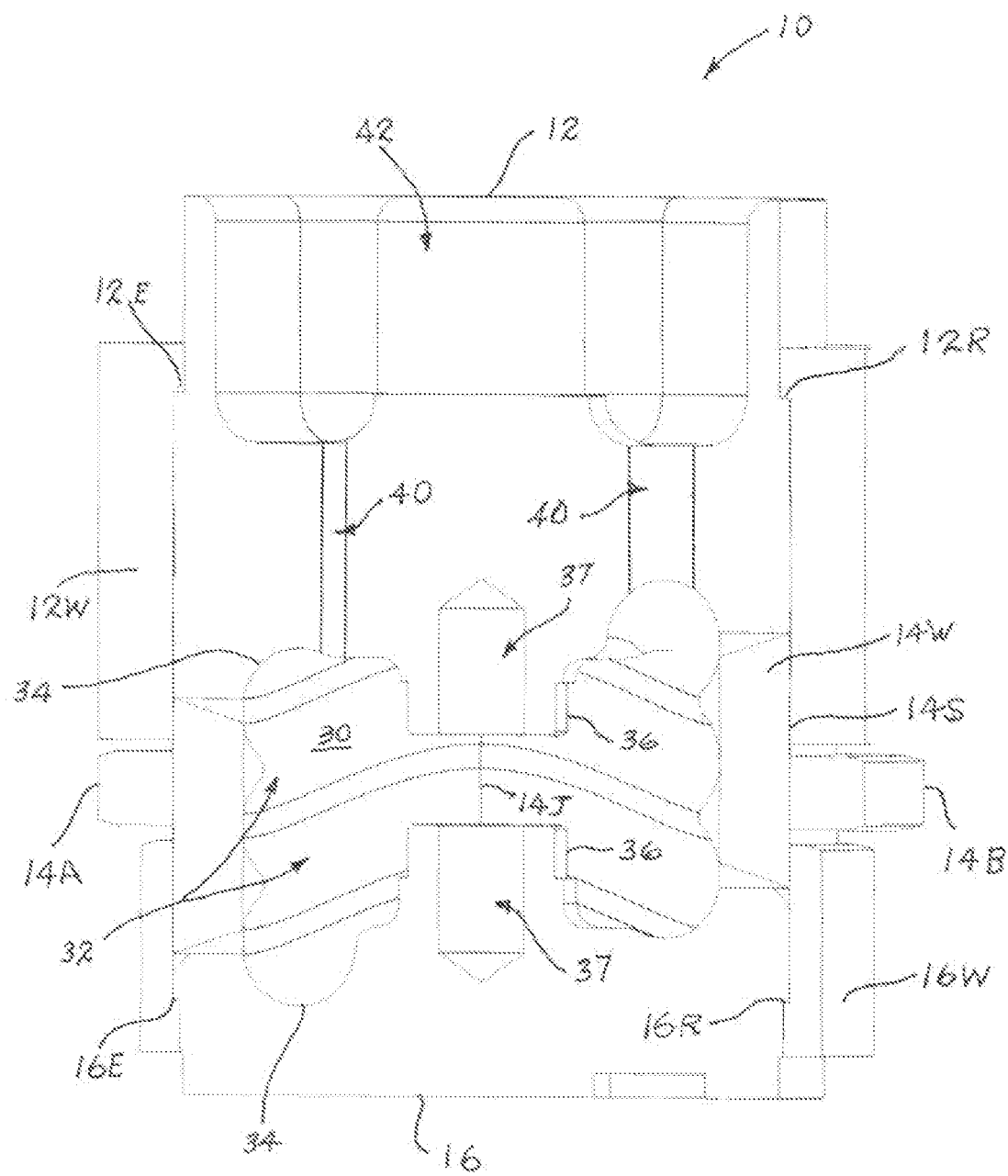
FIG. 2 illustrates a perspective view thereof taken from a cutting plane defined by axis 20 and arrows 2-2 of FIG. 1, according to an aspect.

FIG. 2 shows embodiments wherein the upper one of said bodies 12 may have at least two pour holes 40 which join a top cavity 42 with inside cavity surface 30. When a molding compound (not shown) is introduced into top cavity 42, one of the pour holes 40 delivers the molding compound into mold 10 while the second one of the pour holes 40 allows air to escape from mold 10, as an example.

Figure 5:
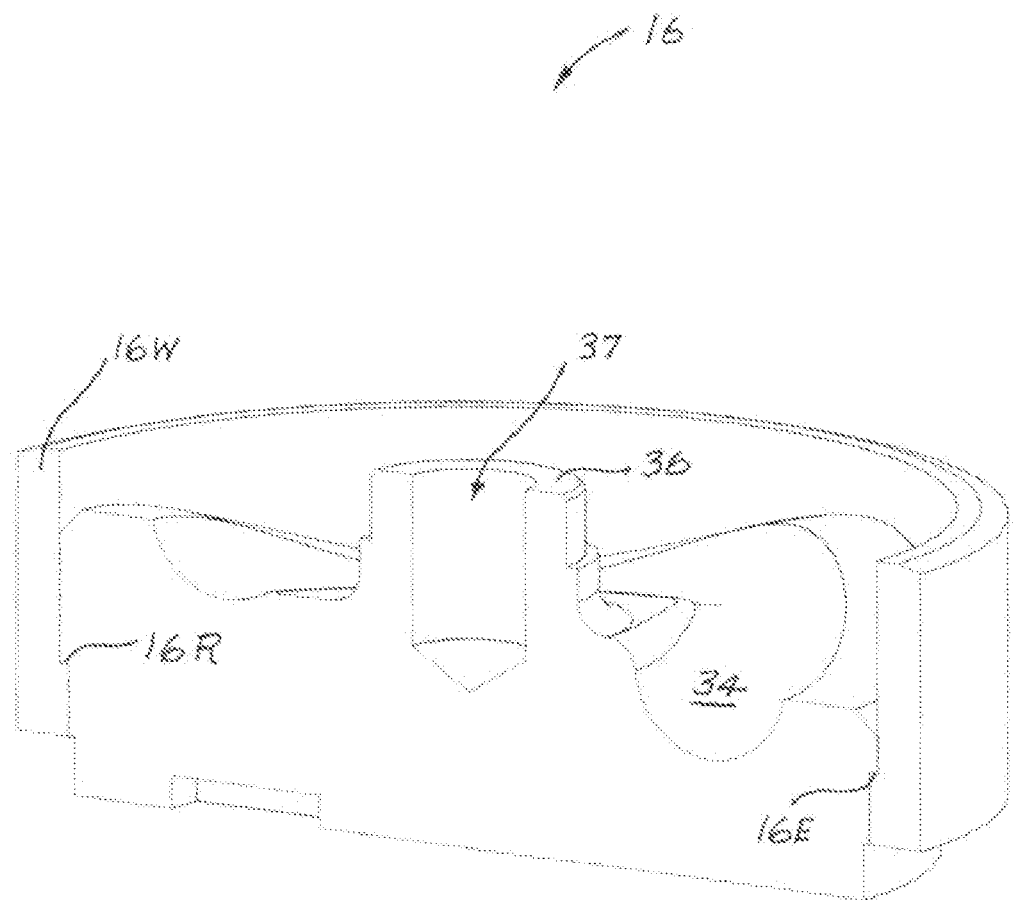
FIG. 5 illustrates a perspective view of the lower body shown in FIG. 2, according to an aspect.

FIGS. 2 and 5 show embodiments wherein the medial one of said bodies 14 may comprise two separate portions 14A and 14B, which when abutted may have a circular conformation or may have a conformation other than circular, as an example. Portions 14A and 14B may be mirror images in shape or may be identical in shape. Medial body 14 may be made up of more than two portions which, as described similarly above, may form a circular shape.

FIG. 2 shows embodiments wherein composite peripheral wall 18 may comprise an upper 12W, a medial 14W, and a lower 16W peripheral wall portions which may be concentric about central axis 20 in order to form a strong structure. Upper 12W and lower 16W peripheral wall portions may abut an external surface 14S of medial wall portion 14W in order to hold the plural portions of body 14 in a tight-fitting arrangement with no chance for molding compound to leak through joints 14J. As further shown in FIG. 2, peripheral walls 12W and 16W may be slidingly engaged with upper 12 and lower 16 bodies respectively for ease of assembly and may have individual extensions 12E and 16E that may be positioned against circular recesses 12R and 16R, respectively, as shown in order to advantageously position walls 12W and 16W relative to bodies 12, 14, and 16.

Figure 3:
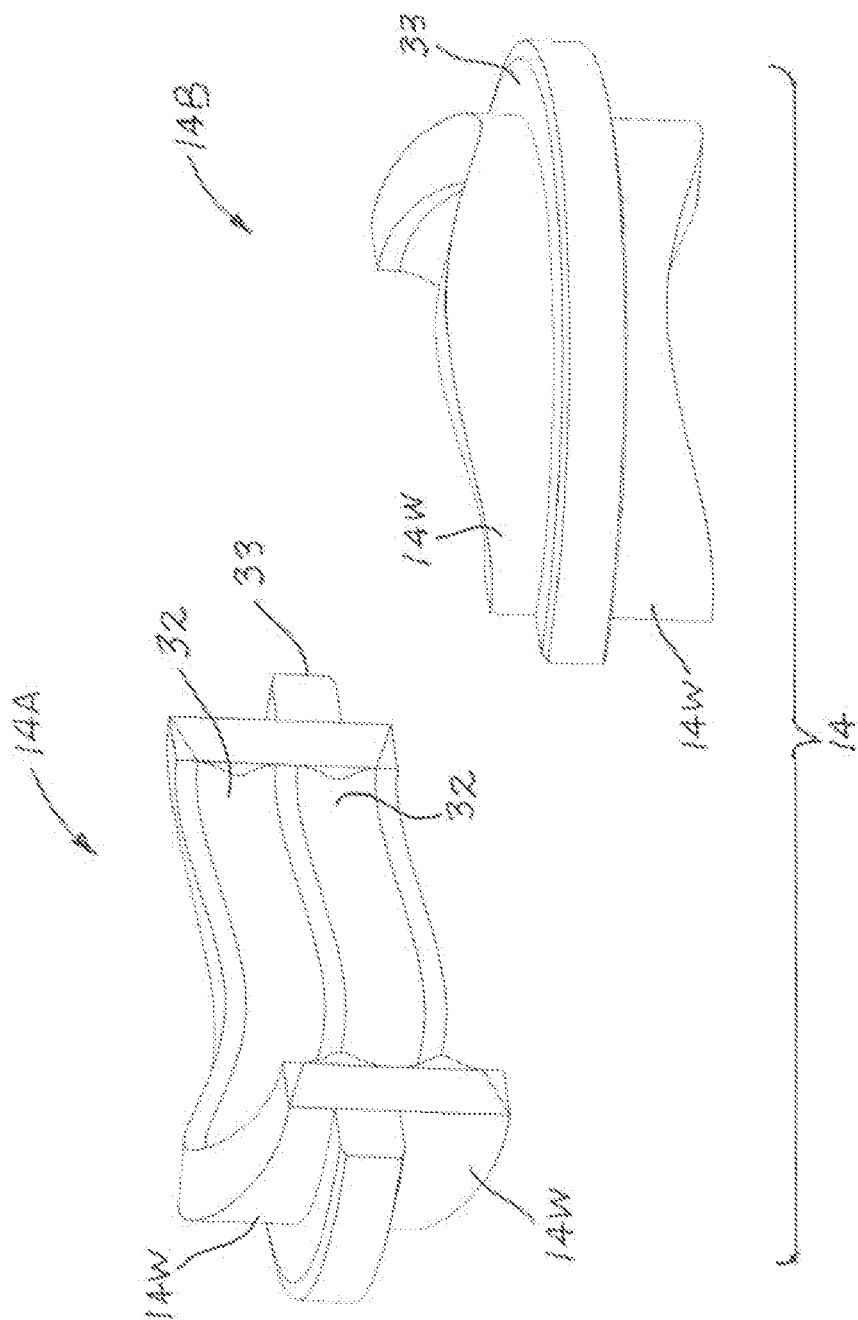
FIG. 3 illustrates a perspective separated view of portions of the medial body thereof, according to an aspect.
Figure 4:
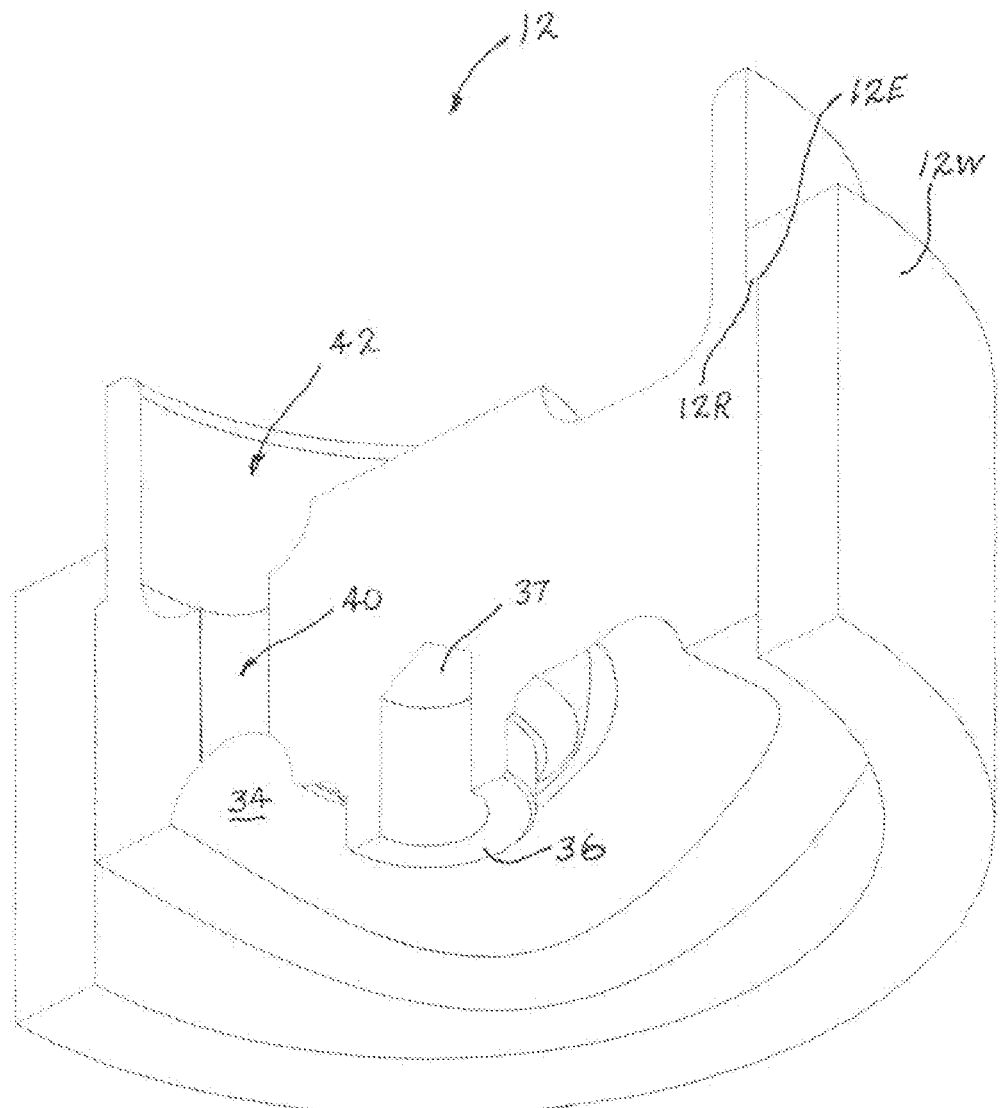
FIG. 4 illustrates a bottom perspective view of the upper body shown in FIG. 2, according to an aspect.

FIG. 3 shows embodiments wherein body 14 and wall 14W may have an outside external ring flange 33 which provides a necessary structural restraining force against expansion forces exerted as curing of the molded object occurs.

Figure 6:
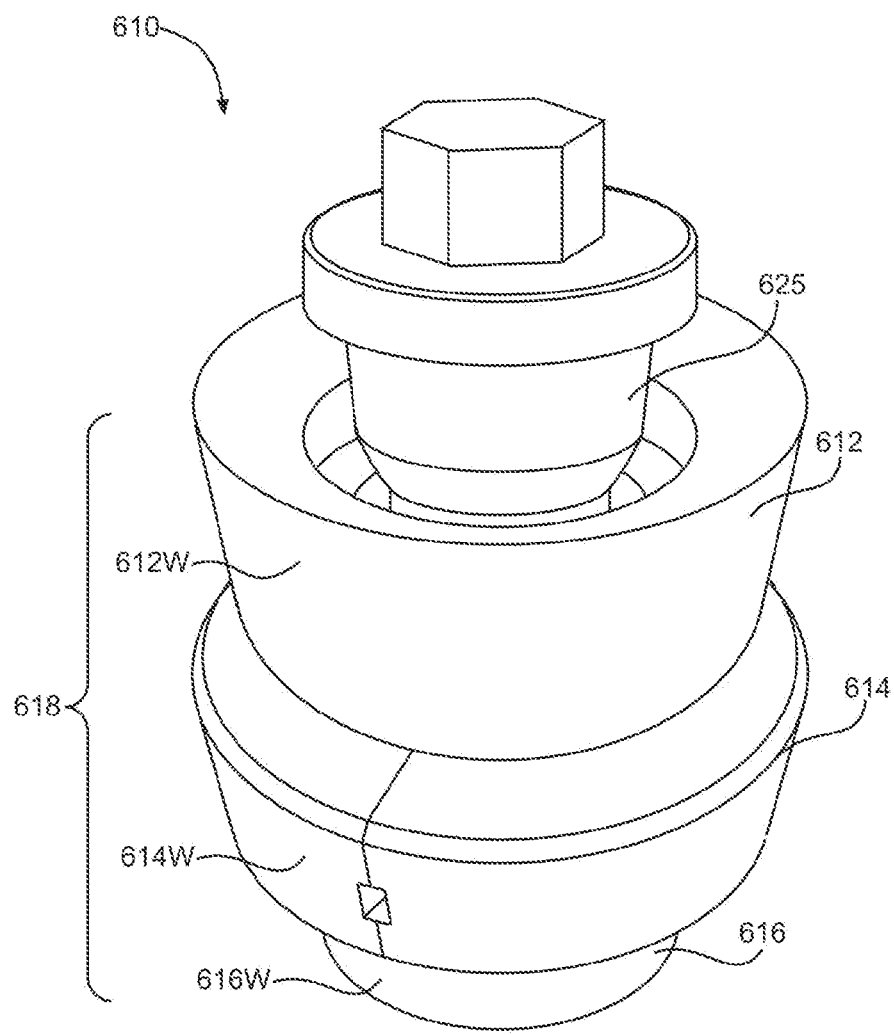
FIG. 6 illustrates a top perspective view of an exterior of another exemplary embodiment of a mold having top, middle, and bottom portions, according to an aspect.

FIG. 6 illustrates a top perspective view of an exterior 618 of another exemplary embodiment of a mold 610 having top 612, middle 614, and bottom 616 portions, according to an aspect. As shown, each portion ("portion," "structure," "body") of the mold 610 may comprise individual walls, such that the top portion 612 comprises a wall portion 612W, the middle portion 614 comprises a wall portion 614W, and the bottom portion 616 comprises a wall portion 616W, as an example. As shown in FIG. 6, the top 612W, middle 614W, and bottom 616W wall portions may thus form a staggered outer or exterior surface ("exterior surface," "peripheral walls") 618 when the mold 610 is properly assembled. As shown, each wall portion 612W, 614W, 616W may be coaxial or concentric about a central rod or pole 625, which will be described in greater detail later, such that the mold 610 comprises a vertical central axis (as in 20 in FIG. 1). As will be discussed throughout this disclosure below, the mold 610 may be subject to gravity-poured materials/molding compound for the formation of a molded object having a complex shape, as an example.

Figure 7:
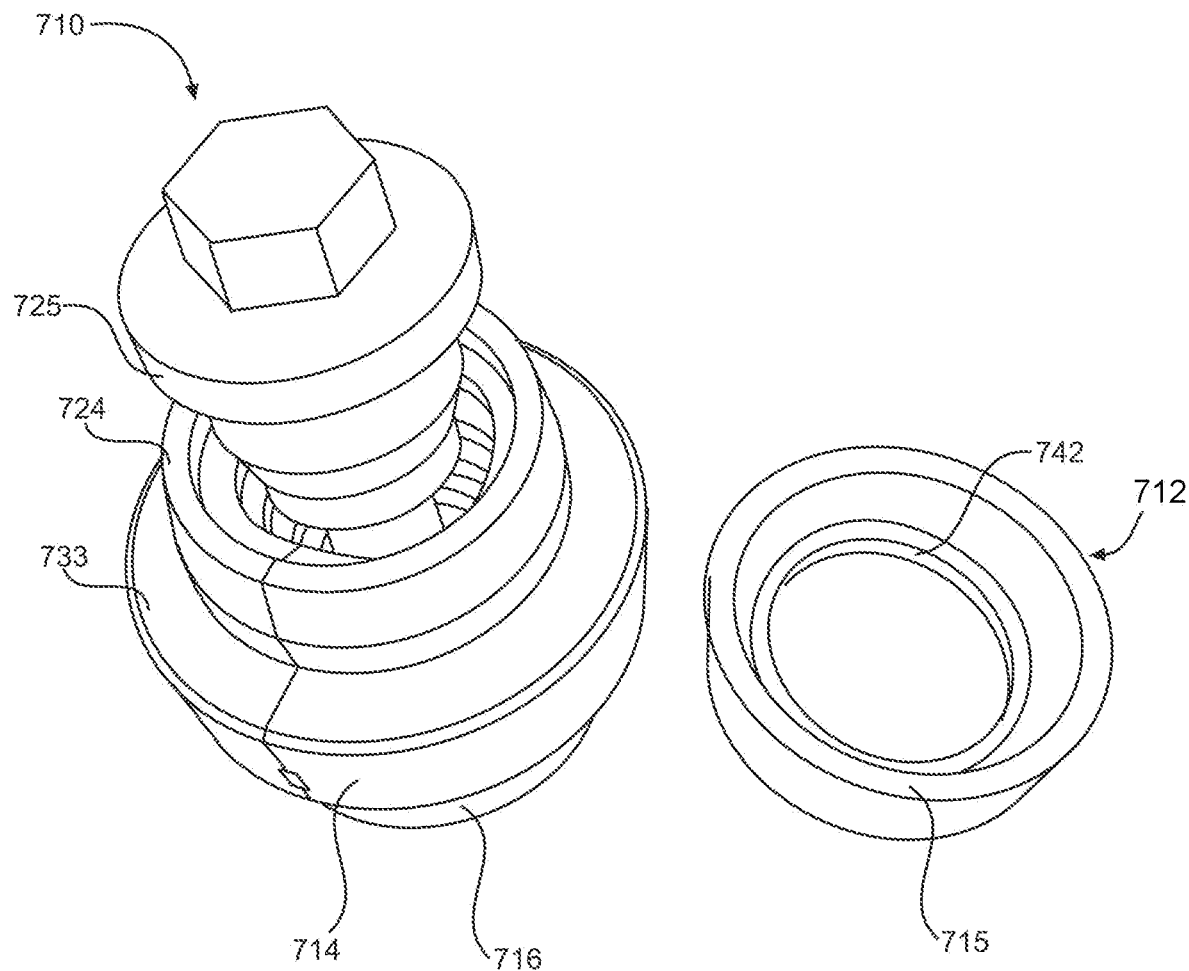
FIG. 7 illustrates a top perspective view of the exemplary embodiment of the mold shown in FIG. 6, with the top portion separated and shown upside down, according to an aspect.

FIG. 7 illustrates a top perspective view of the exemplary embodiment of the mold 610 shown in FIG. 6, with the top portion 712 separated and shown upside down, according to an aspect. As shown in FIG. 7, each structural portion 712, 714, 716 may be adapted to be easily removable from the mold assembly 710. As shown by the upside-down view, the top structure 712 may be provided with a bottom surface ("bottom surface," "bottom diameter") 715, which rests on an external ring flange 733 when the top 712 is assembled onto the middle portion 714 of the mold 710. As an example, the top portion 712 may also comprise a center hole ("center hole," "top hole") 742, as shown, which rests on a top surface 724 of the middle structure 714 when the mold 710 is assembled. As similarly described above, the center hole 742 of the top 712 and the top surface 724 of the middle 714 concentrically surround the center rod 725, such that a mold compound may be easily poured into the mold via the center hole 742. Additionally, as will be described below, the top structure 712 may structurally support the middle portion 714, which may consist of two pieces (see e.g., FIG. 10). Thus, the top structure may help seal the two pieces of the middle structure 714 together, such that no mold compound escapes from the mold cavity (not shown) during curing, for example.

Figure 8:
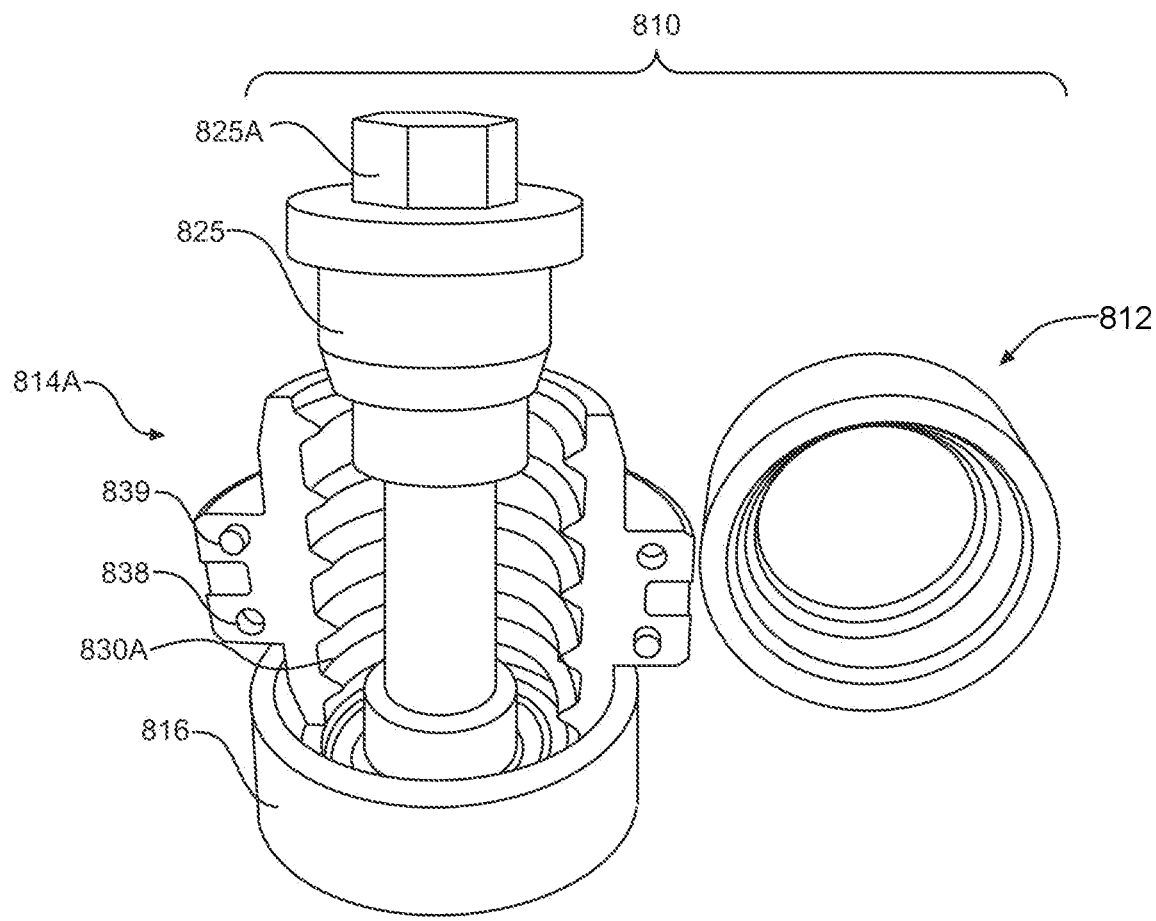
FIG. 8 illustrates a side perspective view of the exemplary embodiment of the mold shown in FIG. 6, with a portion of the middle removed, and the top separated, according to an aspect.

FIG. 8 illustrates a side perspective view of the exemplary embodiment of the mold 610 shown in FIG. 6, with a half of the middle 614 removed, and the top 812 separated, according to an aspect. As mentioned previously, each of the structural portions 812, 814A, 816 of the mold 810 may be adapted to be easily buildable and removable, as shown. Thus, due to the minimal number of mold components, an advantage is an improvement in manufacturing time and therefore a reduction in manufacturing costs. As shown in FIG. 8, the central rod 825 may be attached to the bottom structure 816 and may extend centrally through the mold assembly 810. Additionally, the central rod 825 may comprise a top attachment cap 825A (e.g., a hex cap) for facilitating the attachment and removal of the rod 825 into and out of the bottom structure 816, as an example. The central rod 825 may be constructed of a heavy material (e.g., steel) such that, when the molding compound (e.g., polyurethane) is poured into the mold 810, the weight of the central rod 825 holds the mold assembly 810 down and in place, as an example. It is advantageous for the mold assembly 810 to be securely held down in this way to ensure the resultant molded object is concentric about the center rod, for example.

As shown in FIG. 8 and as previously mentioned above, the middle portion of the mold may comprise two halves, that, when joined together, form the middle portion (e.g., 714 in FIG. 7). A first half 814A of the middle structure is shown in FIG. 8; as will be described in detail below, the second half of the middle structure may comprise the same exemplary elements as the first half 814A. As shown, the first half 814A may sit within the bottom portion 816, such that no mold compound may leak through the bottom of the middle structure when the mold is assembled, as an example. As an example, the first half 814A may be provided with a pair of connection processes 839 and a pair of receiving holes 838, as shown. As should be understood, the second half (not shown) of the middle structure may comprise corresponding connection processes 839 and receiving holes 838, such that the two halves can join securely together and form the middle structure of the mold, as an example. As shown, the first half 814A may further comprise an interior cavity surface 830A, which forms a first half of the mold cavity, as an example. As such, when the two halves of the middle structure are joined together, the respective interior cavity surfaces may form a continuous mold cavity within the middle structure. As an example, the mold cavity, during the molding process, may define the outer shapes and physical complexities of the molded object (e.g., a pallet jack wheel). As will be described in greater detail below, the mold cavity surface may be provided with particularly shaped channels that define the aforementioned shapes and complexities, as an example.

Figure 9:
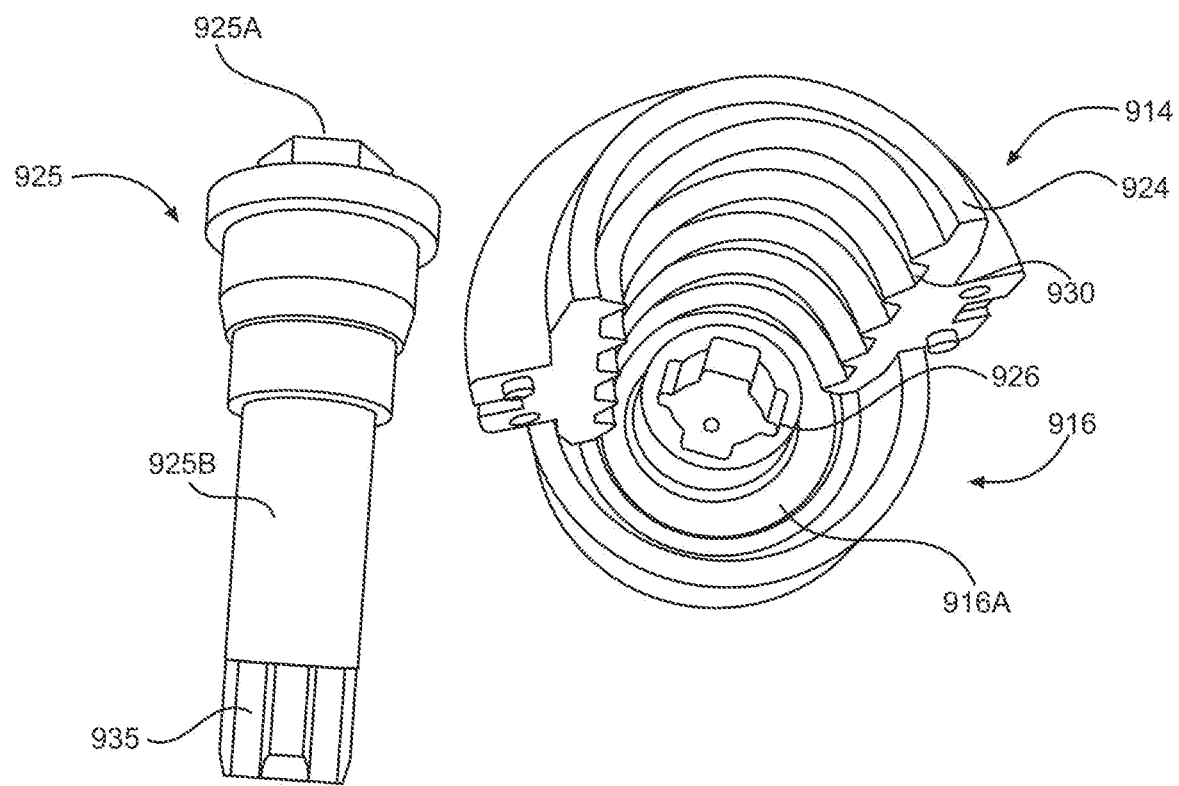
FIG. 9 illustrates a top perspective view of the exemplary embodiment of the mold shown in FIG. 8, showing an interior of the bottom portion with the central rod separated, according to an aspect.

FIG. 9 illustrates a top perspective view of the exemplary embodiment of the mold 810 shown in FIG. 8, showing an interior 916A of the bottom portion 916 with the central rod 925 separated, according to an aspect. As mentioned previously above, the central rod 925 may be securely attached within the bottom structure 916. As shown, the central rod 925 may comprise a set of bottom grooves 935 which may tightly slide into a central port 926 of the bottom interior 916A, as an example. The association of the set of bottom grooves 935 and the central port 926 may keep the central pin 925 secured to the bottom portion 916, such that the central pin 925 may be secured to the mold when assembled. In an alternative embodiment, the central rod 925 may be provided with a set of bottom threads, as an example. The central port 926 may thus be provided with a corresponding set of internal threads, such that the central rod can be screwed into the central port, as an example. The top attachment cap 925A may facilitate the screwing of the central rod 925 into the central port 926 (via a wrench, for example) in this embodiment.

As described previously above, the central rod 925 may provide a weighing effect onto the mold when assembled. Because the central pin 925 securely attaches to the base 916A of the bottom 916, the central pin 925 may not move or shift as molding compound is poured into the mold, further ensuring that the molded object is concentric about the central pin 925 after curing. As shown, the central pole 925 may further comprise a cylindrical body 925B. As an example, when the mold is assembled, the pole body 925B may extend between the bottom interior 916A and the top surface 924 of the middle structure 914. Thus, when the mold compound is distributed into the mold, and the mold compound fills the mold cavity defined by the cavity surface 930, the mold compound may surround the pole body 925B, such that a central hole is created in the molded object after curing. As an example, let the molded object be a pallet jack wheel, such that the pole body 925B creates a center bore hole (e.g., for an axle to fit through) in the molded pallet jack wheel.

Figure 10A:
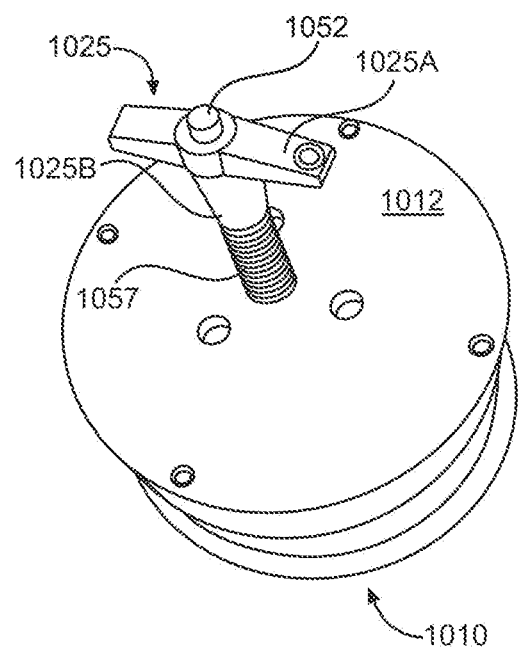
FIGS. 10A-10C illustrate an alternative embodiment of the central rod shown in FIG. 9, according to an aspect.
Figure 10B:
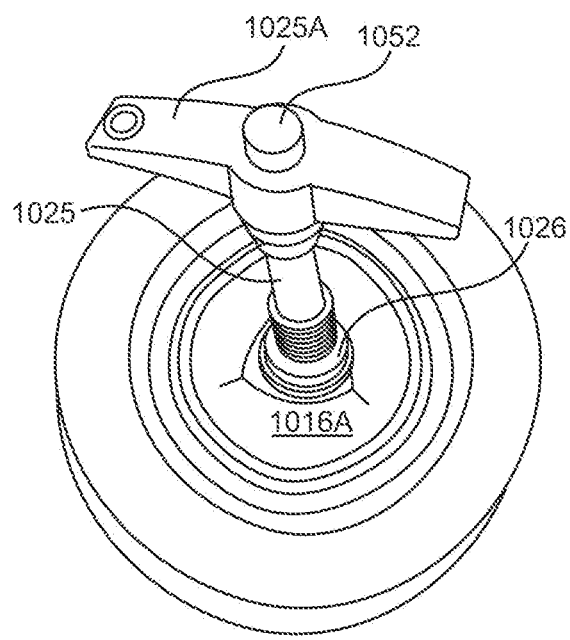
Figure 10C:
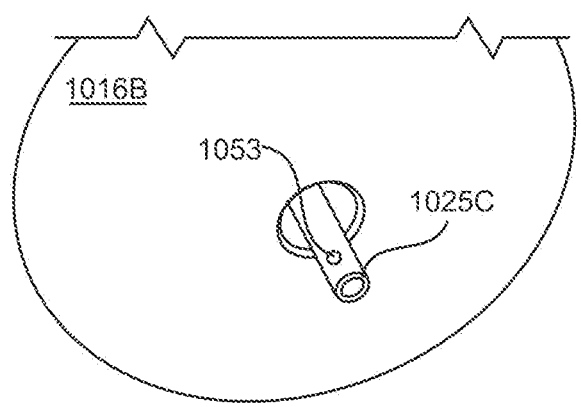

FIGS. 10A-10C illustrate an alternative embodiment of the central rod 925 shown in FIG. 9, according to an aspect. As shown in FIGS. 10A-10C, the central pin 1025 may be provided with a top 1025A, a central body 1025B and a bottom 1025C. The top 1025A may be provided with a pushbutton 1052, which may cause the contraction of a bottom pin 1053, shown in FIG. 10C, which may secure the central rod 1025 into the central port 1026 of the bottom body surface 1016A, as an example. The top 1025A may be designed having arms, as shown, that may assist a user with holding the center rod 1025 and therefore assist with the insertion and/or removal of the rod 1025, as an example. The central pin 1025 may also be provided with a spring 1057 disposed around the central body 1025B, which provides a resistive force for the central pin 1025 when inserted into the top body 1012. As an example, said resistive force may help keep the mold 1010 assembled, due to the downward push against the top body 1012 by the spring 1057, which may further help prevent any leakage or shifting when the molding compound is applied to the mold 1010, as an advantage.

As mentioned above, engagement/pushing of the pushbutton 1052 may cause the contracting of the bottom pin 1053, shown in FIG. 10C. When the mold 1010 is being assembled, as an example, the user may press the pushbutton 1052 to cause the bottom pin 1053 to contract, such that the pin 1053 is pulled into the bottom 1025C of the center rod 1025. The user may then insert the center rod 1025 through the top body 1012 and all the way out through the bottom surface 1016B of the bottom body, as shown in FIG. 10C. Finally, the user may disengage/release the pushbutton 1052, which may cause the bottom pin 1053 to extend/protrude, as mentioned previously. The extension of the bottom pin 1053, as shown in FIG. 10C, prevents the central rod 1025 from being able to be removed from the mold assembly 1010, since a length of the extended pin 1053 is wider than a diameter of the central port 1026, shown in FIG. 10B. Thus, the central rod 1025 is securely maintained within the mold 1010, providing the mold 1010 with structural security during the molding process, as described above. Once the molded object is done curing, the top pushbutton 1052 may be engaged again, causing the bottom pin 1053 to contract, and the center rod 1025 can be easily removed from the mold 1010. Thus, an advantage is the reduction in demolding time due to the quick and efficient removal of the center rod.

Figure 11:
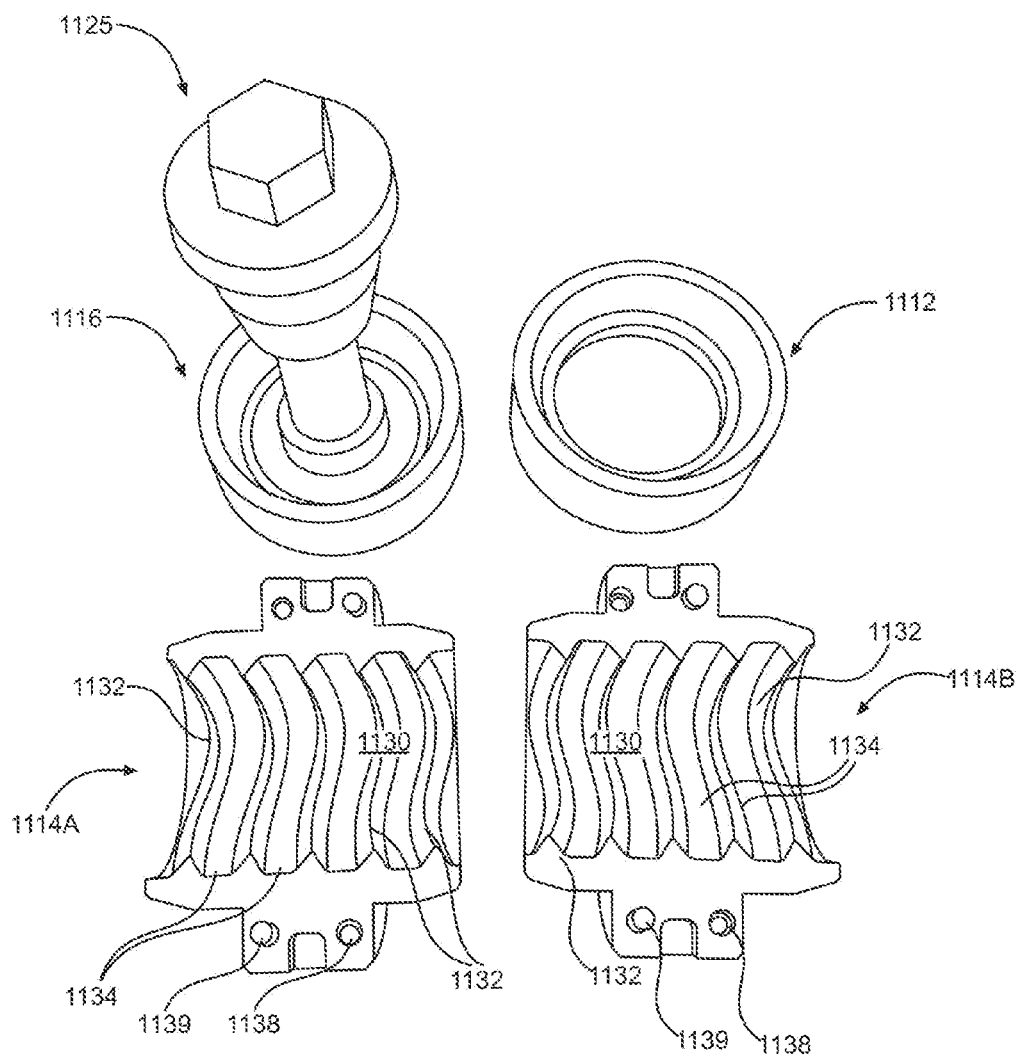
FIG. 11 illustrates a top perspective separated view of the top, middle, and bottom portions of the exemplary embodiment of the mold shown in FIG. 6, according to an aspect.

FIG. 11 illustrates a top perspective separated view of the top 1112, middle 1114A, 1114B, and bottom 1116 portions of the exemplary embodiment of the mold 610 shown in FIG. 6, according to an aspect. As shown in FIG. 11, each portion of the mold assembly may be easily separable and buildable due to the minimal number of mold components, as described herein above. Because of the easily separable nature of the top 1112, middle 1114A, 1114B, and bottom 1116 structures of the mold, a molded object may thus easily be demolded (i.e., removed) after curing. As an example, after the molding compound (e.g., polyurethane) has been poured into the mold and has hardened, the central rod 1125 may be removed from the mold assembly (e.g., 610 in FIG. 6). A user may remove the central rod 1125 by pulling upwardly on the central rod 1125, such that the set of bottom threads (e.g., 935 in FIG. 9) are disengaged from the bottom port (e.g., 926). Then, the user may remove the top portion 1112 from the mold assembly, such that the middle structure is accessible. The user may then remove the middle structure from the bottom 1116, such that the molded object may be kept intact within the middle structure. Finally, the user may disjoin the first half 1114A from the second half 1114B, such that the molded object is completely removed from the mold and is thus demolded. Thus, an advantage is that, compared to current demolding methods, because less time may be spent demolding the molded object, manufacturing costs may be reduced. Additionally, because of the ease of demolding, no springs or slides need to be placed on the mold to facilitate removal of the molded object from the mold.

As mentioned previously above, the middle portion of the mold may comprise two halves 1114A, 1114B. As shown in FIG. 11, the two halves 1114A, 1114B may be identical, such that each half comprises the same elements and designs, as an example. As shown, both halves 1114A, 1114B may each comprise a pair of connection processes 1139 and a pair of receiving holes 1138, such that the two halves 1114A, 1114B may be connected and sealed together, for example, to prevent mold compound from leaking out of the mold during molding. As shown, the respective cavity surfaces 1130 of the two halves 1114A, 1114B, when joined, may form the mold cavity, which determines the overall appearance and shape of the molded object, which may be complex, as an example. The mold cavity surface 1130 may be provided with a plurality of channels 1134, as shown, defined by a plurality of protrusions 1132, which may alternately line the mold cavity surface 1130. As an example, each protrusion of the plurality of protrusions 1132 may be sinewave shaped, as shown, such that each channel of the plurality of channels 1134 may thus also be sinewave shaped. In this example, let the plurality of protrusions 1132 be five protrusions such that the plurality of channels 1134 is thus six channels, as shown. The mold cavity may thus create a molded object having a complex shape, such as a pellet jack wheel having six successive sinewave shaped channels, for example.

As mentioned above, the two halves 1114A, 1114B may be identical and may comprise the same exemplary components and configurations, as shown in FIG. 11. Because each half 1114A, 1114B is configured the same, no particular protocol needs to be followed when joining the two halves 1114A, 1114B together and assembling the mold, for example. In other words, the two halves 1114A, 1114B may be joined together with 1114A positioned on the left side or on the right side (via a top view), for example. Additionally, when assembled, the middle structure (formed by the two halves 1114A, 1114B) may be placed onto the bottom structure 1116 "upside-down" (e.g., in FIG. 9, with 924 contacting 916A), as opposed to the particular arrangement shown in FIG. 9, for example. Thus, because of the great flexibility in regard to the order of assembling the mold and/or the positioning of the halves of the middle structure, as opposed to the mold shown in FIGS. 1-5, the possibilities for mistakes occurring during the molding process are greatly reduced. Thus, an advantage is that the flexibility of the placement of the mold structures may allow for a nearly error-free molding process.

As an example, the mold (610), including each of its components and structures, may be constructed of any suitably durable material like metal (e.g., steel, aluminum), such that to allow the mold to be structurally supported and the mold cavity to be kept intact during the molding process.

Additionally, although the mold is described herein above as having a staggered outer surface (618), it should be understood that other shapes and arrangements are also possible (e.g., cylindrical), so long as the middle structure is structurally supported such that the halves are sealed together. It should also be understood that each structure of the mold may be constructed to be a shape other than circular, e.g., rectangular, depending on the needs (e.g., shape, definition) of the molded object to be produced by the mold cavity. It should be noted that although the top structure is depicted as having an inner diameter for applying molding compound to the mold, the top structure may be configured to have individual pour holes for the applying the molding compound.

Figure 12A:
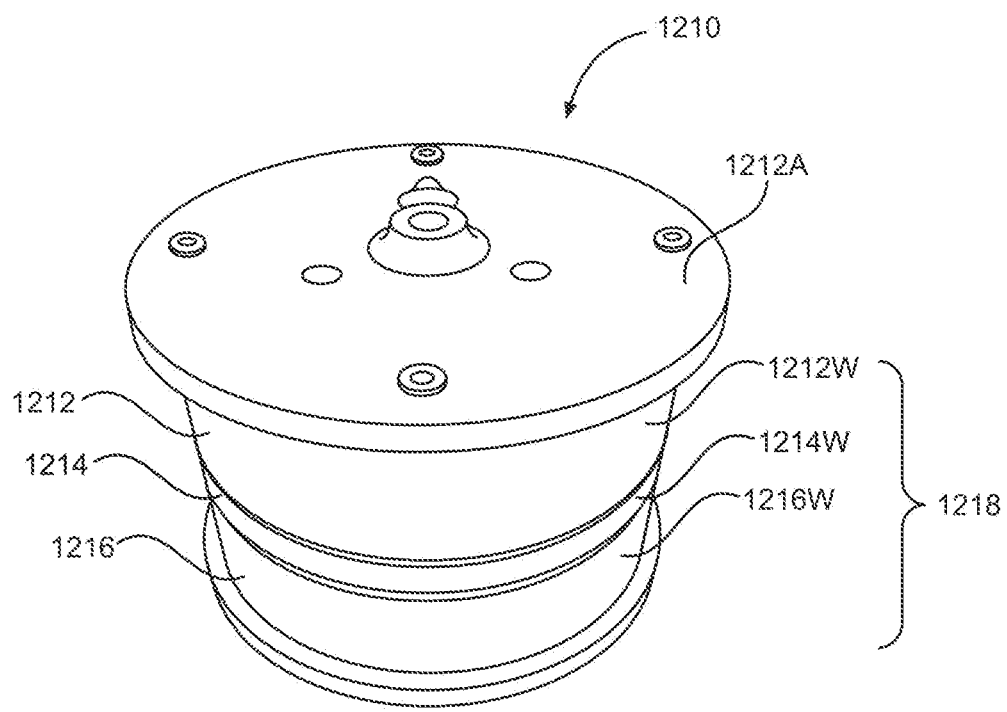
FIGS. 12A-12B illustrate a top perspective view and a top view, respectively, of another exemplary embodiment of a mold having a top, middle, and bottom portions, according to an aspect.
Figure 12B:
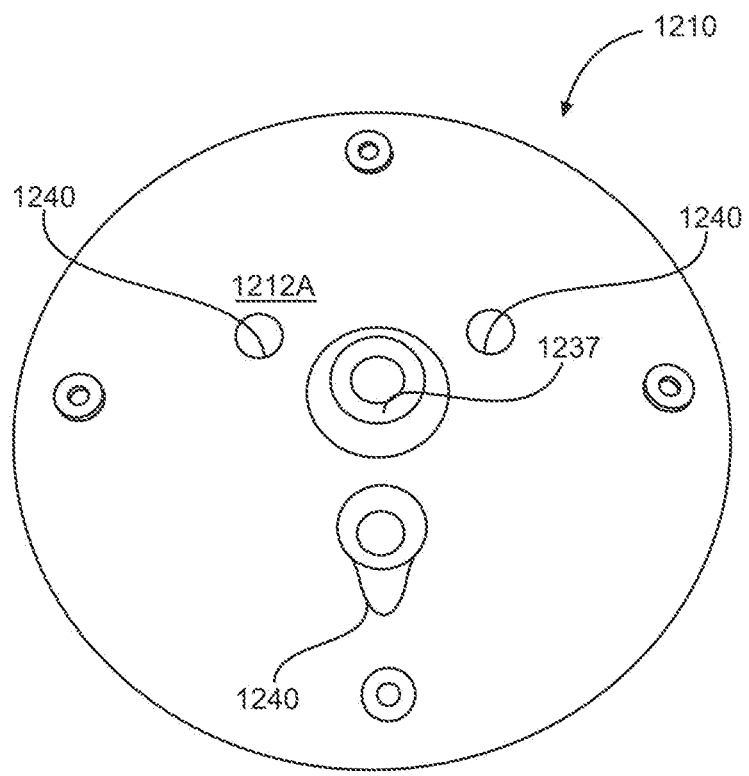

FIGS. 12A-12B illustrate a top perspective view and a top view, respectively, of another exemplary embodiment of a mold 1210 having a top 1212, middle 1214, and bottom 1216 portions, according to an aspect. As shown, each body of the mold 1210 may comprise individual walls, such that the top body 1212 comprises a wall portion 1212W, the middle body 1214 comprises a wall portion 1214W, and the bottom body 1216 comprises a wall portion 1216W, as an example. As shown in FIG. 12A, the top 1212W, middle 1214W, and bottom 1216W wall portions may thus form a generally cylindrical outer or exterior surface 1218 when the mold 1210 is properly assembled. As shown, each wall portion 1212W, 1214W, 1216W may be coaxial or concentric about a center hole 1237, shown in FIG. 12B, which will be described in greater detail later, such that the mold 1210 comprises a vertical central axis (as in 20 in FIG. 1). As will be discussed throughout this disclosure below, the mold 1210 may be subject to gravity-poured materials or molding compound for the formation of a molded object having a complex shape, as an example.

As shown, the top structure 1212 may comprise a top surface 1212A, as an example. As shown in FIG. 12B, the top surface 1212A may be provided with a plurality of through holes ("through holes," "pour holes") 1240 and may comprise the central hole 1237, as an example. The plurality of through holes 1240 may function as downward flow passages for the mold compound to be gravity poured/inserted into the mold 1210, as an example. Additionally, at least one of the plurality of through holes 1240 may act as an air vent for air to escape out of the mold 1210, as an example. As will be discussed in greater detail later, the central hole 1237 may create a hole in the molded object, which may be for example, a center bore hole in a wheel.

Figure 13:
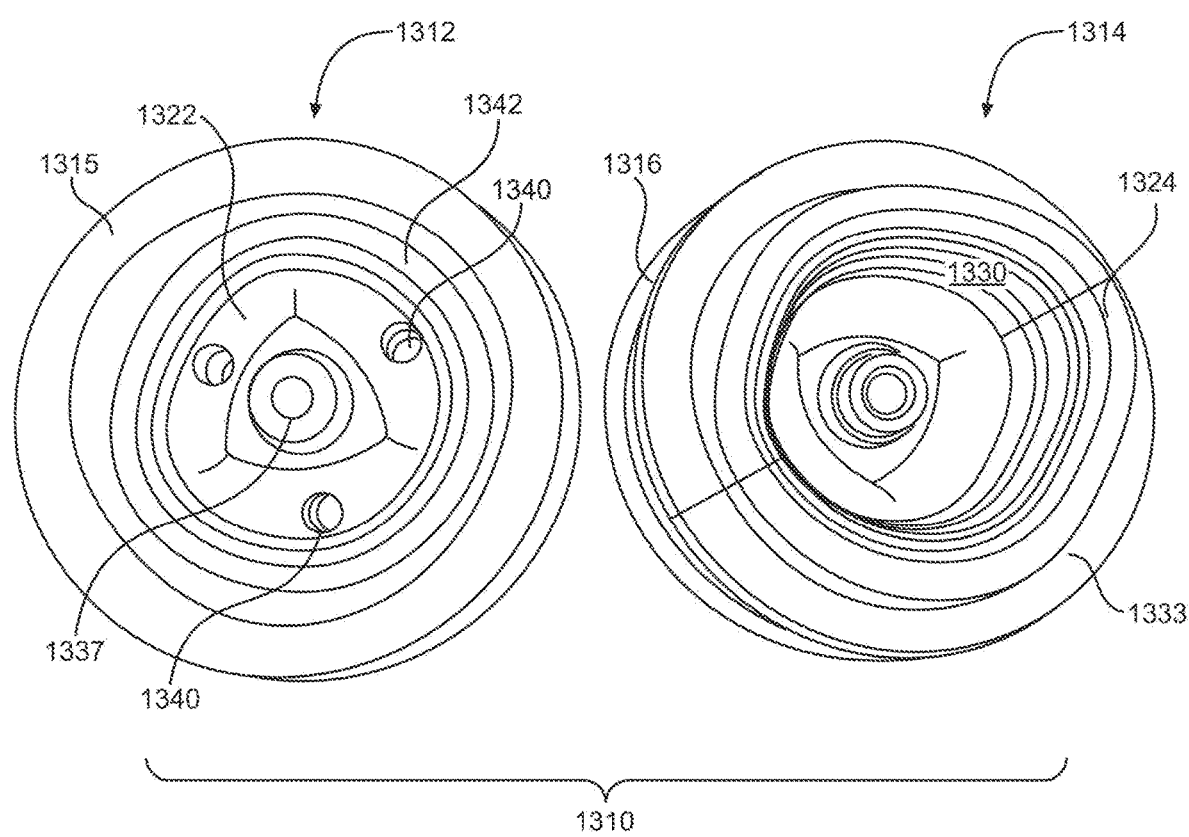
FIG. 13 illustrates a top view of the exemplary embodiment of the mold shown in FIGS. 12A-12B, with the top portion separated and shown upside down, according to an aspect.

FIG. 13 illustrates a top view of the exemplary embodiment of the mold 1210 shown in FIGS. 12A-12B, with the top portion 1312 separated and shown upside down, according to an aspect. As shown in FIG. 13, each mold structure 1312, 1314, 1316 may be adapted to be easily removeable and/or stackable onto each other, as an example. As shown in this upside-down view, the top structure 1312 may be provided with the plurality of pour holes 1340 and the central hole 1337, as similarly described above. As an example, the top structure may also be provided with an interior surface ("interior surface," "top interior") 1322, as shown. The plurality of through holes 1340 may thus extend from the interior surface 1322 to the top surface (1212A in FIG. 12B), as an example. As shown, the top portion 1312 may further comprise a bottom surface or bottom diameter 1315 and a top inner recess 1342, as an example.

As shown in FIG. 13, the middle portion 1314 may comprise an interior cavity surface 1330, which may form the mold cavity of the mold, which thus structures and forms the outside of the molded object during the molding process, as an example. As will be described in greater detail herein below, the top 1312 and the bottom 1316 may also define at least a portion of the mold cavity (e.g., the top and the bottom of the cavity). As shown, the middle portion 1314 may further comprise a top surface 1324 and an external ring flange 1333, as an example. As an example, when the mold 1310 is assembled, and when the top portion 1312 rests on top of the middle portion 1314, the top surface 1324 of the middle 1314 may fit snugly into the inner recess 1342 of the top 1312, and the bottom surface 1315 may rest on the external ring flange 1333. As will be discussed in greater detail below, the middle portion 1314 may be formed by the joining of two identical halves (not shown). Thus, the top structure 1312 and the external ring flange 1333 may provide structural support to the middle portion 1314, such that no molding compound leaks out of the mold 1310 during the molding process.

Figure 14A:
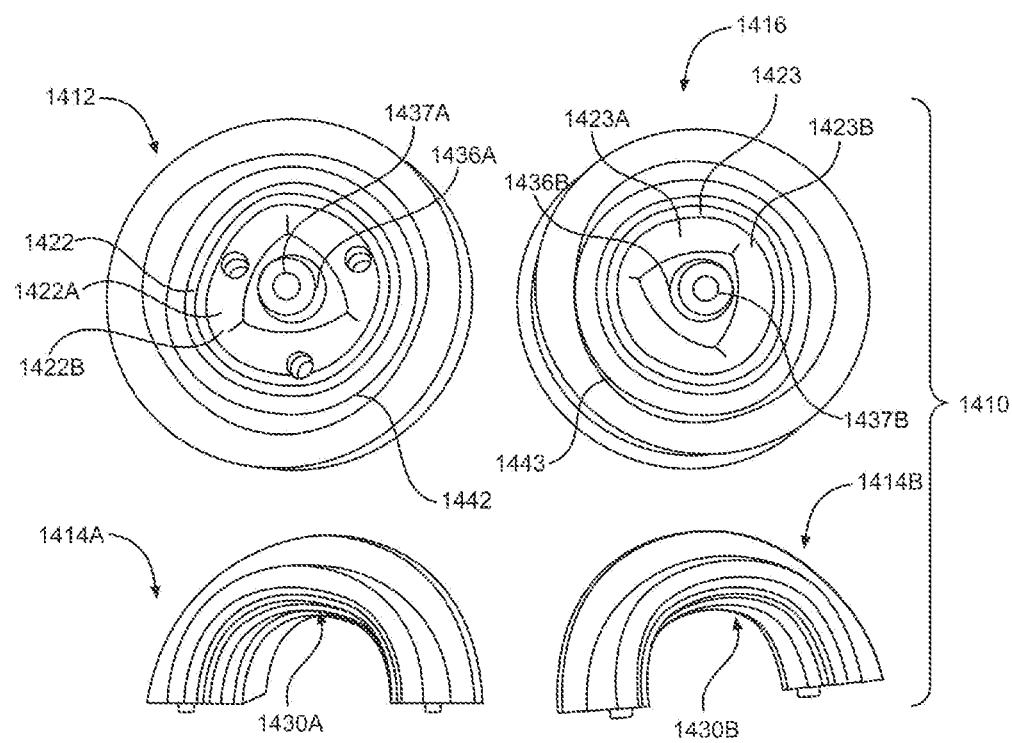
FIGS. 14A-14B illustrate a top separated view and a perspective separated view, respectively, of the top, middle, and bottom portions of the exemplary embodiment of the mold shown in FIGS. 12A-12B, according to an aspect.
Figure 14B:
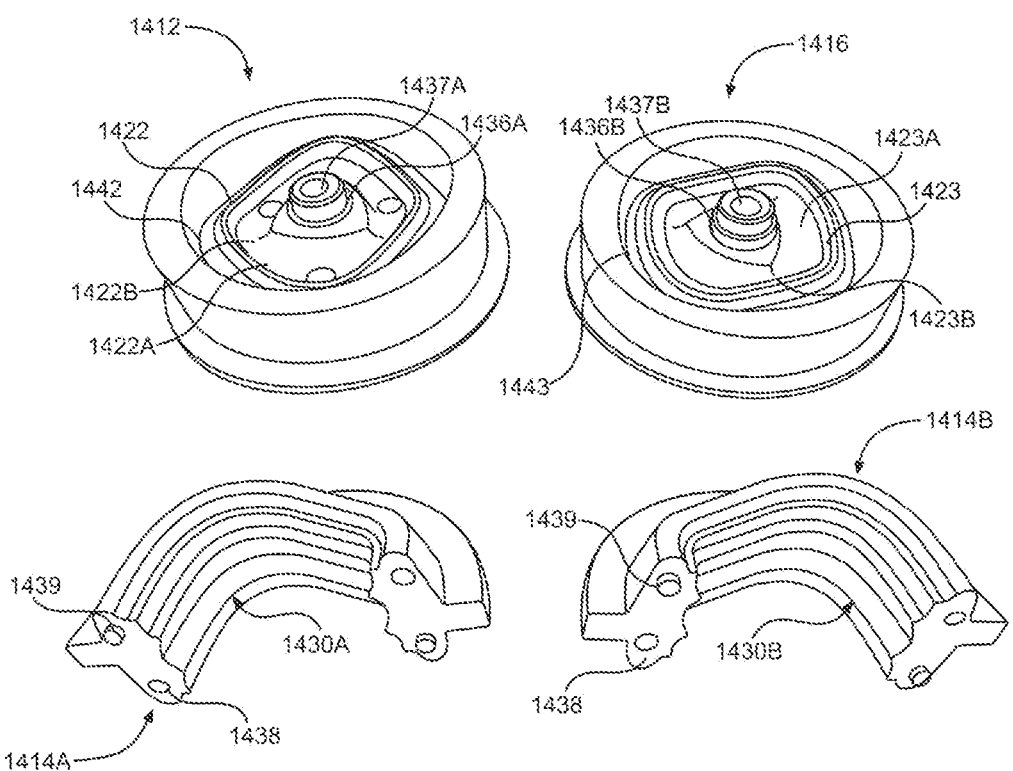

FIGS. 14A-14B illustrate a top separated view and a perspective separated view, respectively, of the top 1412, middle 1414A, 1414B, and bottom 1416 portions of the exemplary embodiment of the mold 1210 shown in FIGS. 12A-12B, according to an aspect. As shown in FIGS. 14A-14B, the mold 1410 may comprise four structures overall, with each structure fitting together to form the mold assembly for the creation of a molded object (e.g., a wheel). Thus, due to the minimal number of mold components, an advantage is an improvement in manufacturing time and therefore a reduction in manufacturing costs.

As mentioned previously above, the middle structure may comprise two halves 1414A, 1414B, as shown, which, when joined together, form the middle structure. As shown in FIG. 14B, each half 1414A, 1414B may comprise a pair of connection processes 1439 and a pair of receiving holes 1438. As an example, the connection processes 1439 of the first half 1414A may be inserted into the receiving holes 1438 of the second half 1414B, and vice versa, such that the halves 1414A, 1414B are securely joined together such that to form the middle structure. As shown, each half 1414A, 1414B may comprise half of the inner cavity surface, such that when the halves 1414A, 1414B are joined, a first surface portion 1430A and a second surface portion 1430B may define a continuous mold cavity surface within the mold, as an example.

As shown in FIGS. 14A-14B, views of the interiors of the top structure 1412 and the bottom structure 1416 are provided. As described previously when referring to FIG. 12B, the top structure 1412 may be provided with a central hole (1237) that may extend through the top surface (shown by 1212A in FIG. 12B). As shown, the top structure 1412 and the bottom structure 1416 may each comprise a half of the central hole, such that the top structure 1412 comprises a first half 1437A and the bottom 1416 comprises a second half 1437B. Thus, when the mold 1410 is assembled, the central hole (formed by 1437A and 1437B) may extend from the top 1412 through the bottom 1416, as an example. As shown, the top 1412 and the bottom 1416 may also be provided with axially aligned cylinders 1436A, 1436B, which form the respective central holes 1437A, 1437B, as an example. As shown, the axially aligned cylinders 1436A, 1436B may also form a portion of the mold cavity, as will be discussed in more detail below. As an example, when the mold disclosed herein is assembled, the axially aligned cylinders 1436A, 1436B may contact each other, such that the center hole extends from the top 1412 to the bottom 1416. Additionally, when the molding compound is applied to the mold, the molded object may, due to the alignment of the axially aligned cylinders 1436A, 1436B, thus have a center hole. As an example, if the molded object is a longboard wheel, the center hole may thus be a center bore hole, which may then be retrofitted with an axle for mounting the longboard wheel to the longboard.

As shown in FIGS. 14A-14B, the top structure 1412 may comprise the interior surface 1422, as similarly mentioned previously. As shown, the interior surface 1422 may be nonuniform, such that the surface quality is not flat, as an example. The interior surface 1422 may be provided with a plurality of top depressions, defined by a plurality of peaks 1422B and a plurality of troughs 1422A, as shown, such that the surface quality follows a wave shape concentrically about the center hole 1437A, as an example. As shown, the pour holes (shown by 1240 in FIG. 12) may be disposed within each trough 1422A in the interior surface 1422, as an example. As such, when the top portion 1412 is assembled on top of the connected halves 1414A, 1414B, and when the assembled mold 1410 is provided with the mold compound (e.g., polyurethane), the interior surface 1422 may form the top of the mold cavity, such that the top of the molded object is defined by the peaks 1422B and the troughs 1422A of the interior surface 1422, as an example. As an example, if the molded object is a longboard wheel, the interior surface 1422 may shape a first outermost surface of the longboard wheel (i.e., the wheel disc or spokes).

Similarly, as shown, the bottom structure 1416 may comprise an interior surface 1423 and a bottom inner recess 1443 surrounding the interior surface 1423, as an example. As shown, the interior surface 1423 and the inner recess 1443 may also be nonuniform, such that the surface quality is not flat, as better shown in FIG. 14B. The interior surface 1423 may be provided with a plurality of bottom depressions, defined by a plurality of peaks 1423B and a plurality of troughs 1423A, as shown, which may coincide with the plurality of peaks 1422B and the plurality of troughs 1422A of the top interior surface 1422, as an example. The surface qualities of the bottom interior surface 1423 and inner recess 1443 may thus also follow a wave shape concentrically about the center hole 1437B, as shown as an example. As such, when the mold 1410 is assembled, and the connected halves 1414A, 1414B sit atop the bottom portion 1416, and when the mold compound is provided into the assembled mold, the bottom interior surface 1423 may form the bottom of the mold cavity surface, such that the bottom of the molded object is defined by the peaks 1423B and the troughs 1423A of the bottom 1416, as an example. As an example, if the molded object is a longboard wheel, the interior surface 1423 may shape a second outermost surface of the longboard wheel, opposite the first outermost surface mentioned above. As shown in FIGS. 14A-14B as an example, the top 1412 and the bottom 1416 may be nearly identical in shape and configuration, except for the presence of the pour holes (e.g., 1240 in FIG. 12).

As mentioned previously above, the mold 1410 may comprise a minimal number of structural components, thus making assembly of the mold fairly straightforward and easy. Additionally, because of the easily separable nature of the top 1412, middle 1414A, 1414B, and bottom 1416 structures of the mold, a molded object may thus easily be demolded (i.e., removed) after curing. As an example, after the mold compound (e.g., polyurethane) has been poured into the mold through the pour holes (e.g., 1240 in FIG. 12) and has hardened, the top portion 1412 may be removed from the mold assembly (e.g., 1210 in FIG. 12A). Then, a user may remove the middle structure (joined halves 1414A and 1414B) from the bottom portion 1416, such that the molded object is kept intact within the middle structure.

Finally, the user may disjoin the first half 1414A from the second half 1414B, such that the molded object is completely removed from the mold and is thus demolded. Thus, an advantage is that, compared to current demolding methods, because less time may be spent demolding the molded object, manufacturing costs may be reduced. Additionally, because of the ease of demolding, no springs or slides need to be placed on the mold to facilitate removal of the molded object from the mold, for example.

Figure 15:
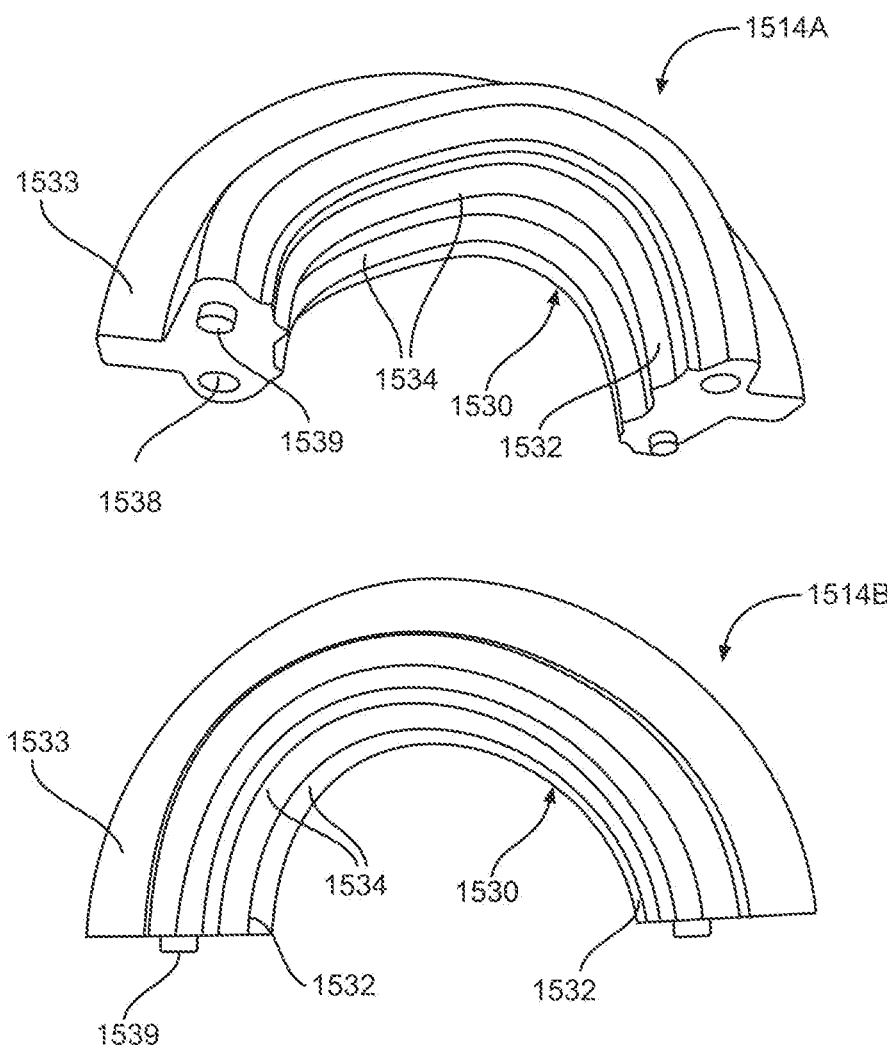
FIG. 15 illustrates a perspective separated view of the middle portions of the exemplary embodiment of the mold shown in FIGS. 14A-14B, according to an aspect.

FIG. 15 illustrates a perspective separated view of the middle portions 1414A, 1414B of the exemplary embodiment of the mold 1410 shown in FIGS. 14A-14B, according to an aspect. As described previously above when referring to FIGS. 14A-14B, the middle portions 1514A, 1514B may, when joined together, help form the mold cavity. As an example, the mold cavity may define the outer exterior definition of the molded object; in the case of a wheel, the mold cavity may shape the barrel or rim of the wheel, for example. As shown in FIG. 15, the mold cavity surface 1530 may comprise a plurality of channels 1534 defined by a plurality of protrusions 1532. The plurality of protrusions 1532 may concentrically line the mold cavity surface 1530, such that the plurality of channels 1534 are disposed periodically within an interior of the middle portions 1514A, 1514B, such that the shown surface quality (1530) is created. In this example, let the plurality of protrusions 1532 be two protrusions and let the plurality of channels 1534 be three channels, as shown. As shown as an example, each of the plurality of protrusions 1532 may be sinewave shaped, such that each adjacent channel 1534 is also sinewave shaped. Thus, as an example, the mold cavity may create a molded object having a complex shape, such as a longboard wheel having three successive sinewave shaped channels, for example.

As previously mentioned herein above, the halves 1514A, 1514B of the middle portion may each be provided with the exterior ring flange 1533, as shown in FIG. 15. As an example, during the molding process, as the molding compound hardens, the molding compound may expand within the mold. The exterior ring flange 1533 may provide a necessary structural restraining force against expansion forces exerted as the curing of the molded object occurs, as an example, since the top portion (e.g., 1412) sits atop the exterior ring flange 1533. Thus, no molding compound may leak out of the mold during the curing process.

As mentioned above, the two halves 1514A, 1514B may be identical and may comprise the same exemplary components and configurations (e.g., channels 1534), as shown. Because each half 1514A, 1514B may be configured the same, no particular protocol needs to be followed when joining the two halves 1514A, 1514B together and assembling the mold, as an example. In other words, the two halves 1514A, 1514B may be joined together with 1514A positioned on the left side or on the right side (via a top view), for example. Additionally, when the mold is assembled, the middle structure (formed by the two halves 1514A, 1514B) may be placed onto the bottom structure (e.g., 1416 in FIG. 14A) "upside-down," as opposed to the particular arrangement shown in FIG. 12, for example. In other words, for example, the top surface (1224 in FIG. 12) of the middle structure can be placed into the bottom structure (1416 in FIG. 14A), such that the top surface (1224) contacts the bottom recess (1443). Thus, because of the great flexibility in regard to the order of assembling the mold and/or the positioning of the halves of the middle structure, as opposed to the mold shown in FIGS. 1-5, the possibilities for mistakes occurring during the molding process are greatly reduced. Thus, an advantage is that the flexibility of the placement of the mold structures may allow for a nearly error-free molding process, and thus an increase in molding efficiency.

As an example, the mold (1210), including each of its components and structures, may be constructed of any suitably durable material like metal (e.g., steel, aluminum), such that to allow the mold to be structurally supported and the mold cavity kept intact during the molding process. Additionally, although the mold is described herein above as having a generally cylindrical outer surface (1218), it should be understood that other shapes and arrangements are also possible (e.g., conical), so long as the middle structure is structurally supported such that the halves are sealed together. It should also be understood that each structure of the mold may be constructed to be a shape other than circular, e.g., rectangular, depending on the needs (e.g., shape, definition) of the molded object to be produced by the mold cavity. It should be noted that although the top structure is depicted as having a plurality of pour holes for applying mold compound to the mold, the top structure may be configured to have a singular pour hole (e.g., center hole) for the applying the mold compound.

Figure 16A:
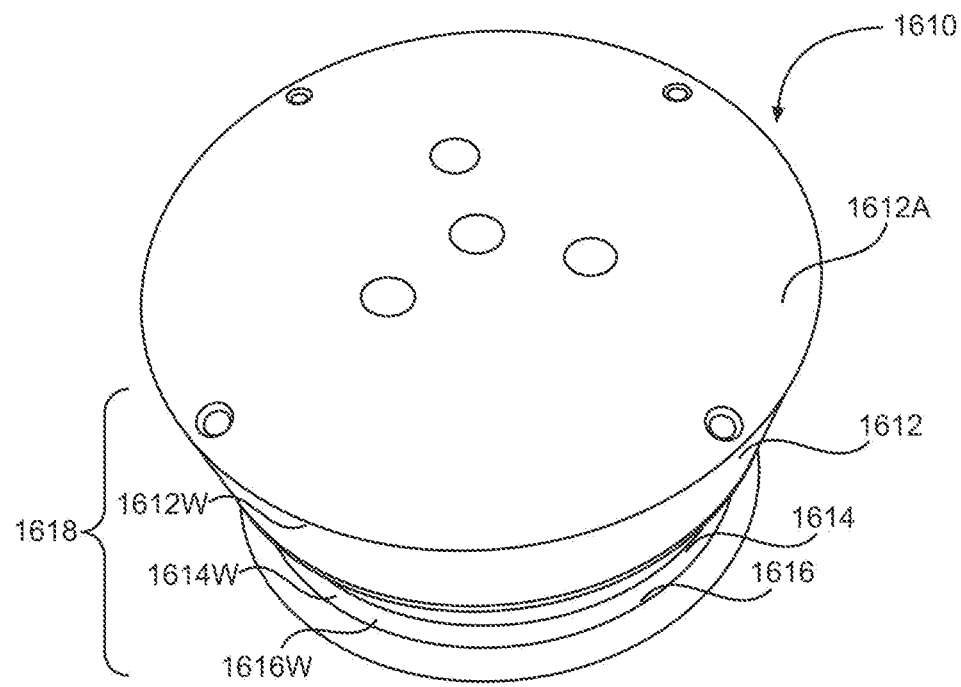
FIGS. 16A-16B illustrate a top perspective view and a top view, respectively, of another exemplary embodiment of a mold having a top, middle, and bottom portions, according to an aspect.
Figure 16B:
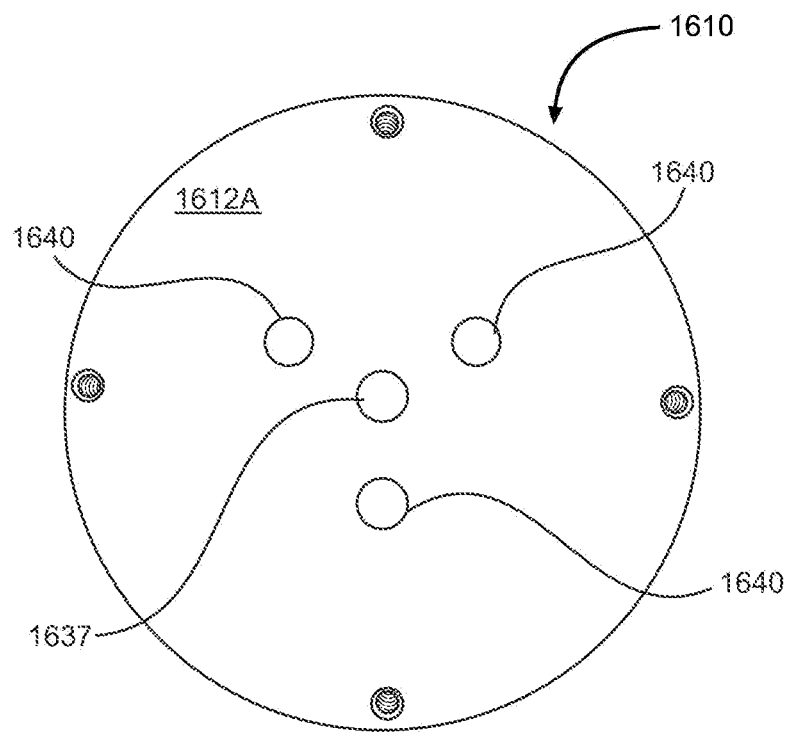

FIGS. 16A-16B illustrate a top perspective view and a top view, respectively, of another exemplary embodiment of a mold 1610 having a top 1612, middle 1614, and bottom 1616 portions, according to an aspect. As shown, each portion of the mold 1610 may comprise individual walls, such that the top portion 1612 comprises a wall portion 1612W, the middle portion 1614 comprises a wall portion 1614W, and the bottom portion 1616 comprises a wall portion 1616W, as an example. As shown in FIG. 16A, the top 1612W, middle 1614W, and bottom 1616W wall portions may thus form a generally cylindrical peripheral walls 1618, when the mold 1610 is properly assembled. As shown, each wall portion 1612W, 1614W, 1616W may be coaxial or concentric about a center hole 1637, shown in FIG. 16B, which will be described in greater detail later, such that the mold 1610 comprises a vertical central axis (as in 20 in FIG. 1). As will be discussed throughout this disclosure below, the mold 1610 may be subject to gravity-poured materials or molding compound for the formation of a molded object having a complex shape, as an example.

As shown, the top structure 1612 may comprise a top surface 1612A, as an example. As shown in FIG. 16B as an example, the top surface 1612A may be provided with a plurality of through holes ("through holes," "pour holes") 1640 and may comprise the central hole 1637, as mentioned above. The plurality of through holes 1640 may function as downward flow passages for the mold compound to be poured/inserted into the mold 1610, as an example. Additionally, at least one of the plurality of through holes 1640 may act as an air vent for air to escape out of the mold 1610 during curing, as an example. As will be discussed in greater detail later, the central hole 1637 may create a hole in the molded object, which may be for example, a center bore hole in a wheel.

Figure 17:
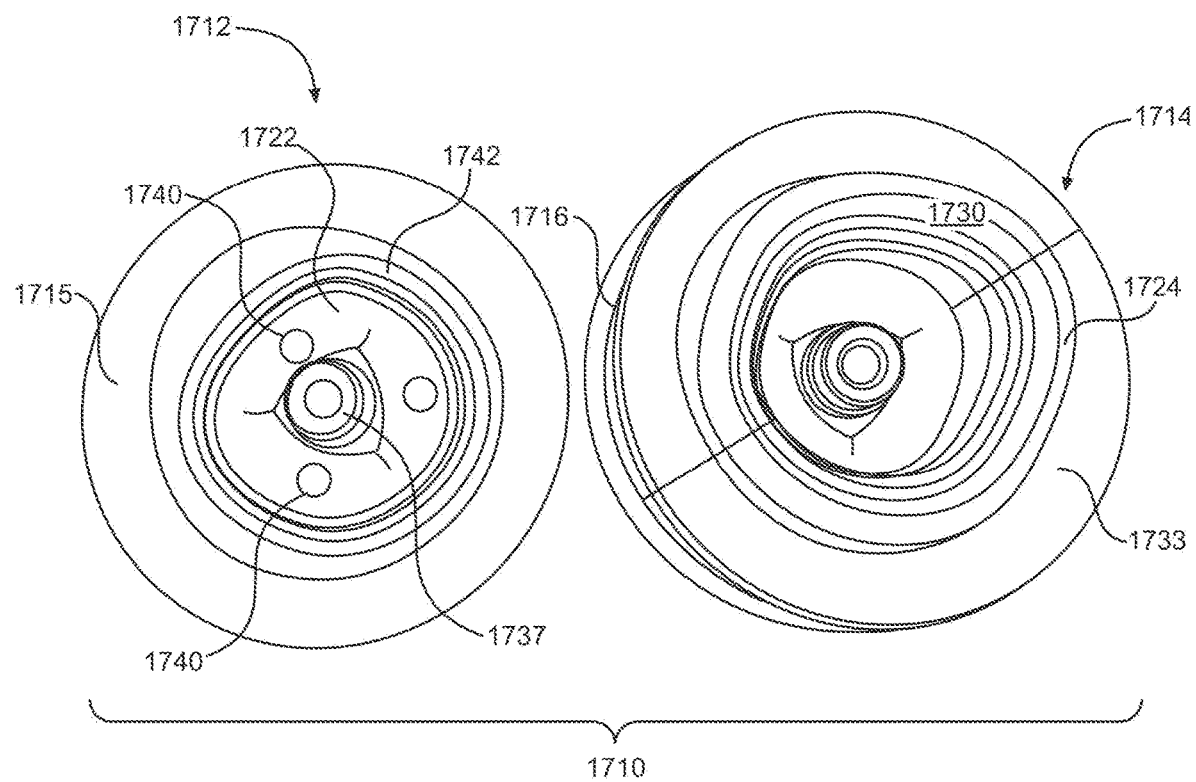
FIG. 17 illustrates a top view of the exemplary embodiment of the mold shown in FIGS. 16A-16B, with the top portion separated and shown upside down, according to an aspect.

FIG. 17 illustrates a top view of the exemplary embodiment of the mold 1610 shown in FIGS. 16A-16B, with the top portion 1712 separated and shown upside down, according to an aspect. As shown in FIG. 17, each mold structure 1712, 1714, 1716 may be adapted to be easily removeable and/or stackable onto each other, as an example. As shown, the top structure 1712 may be provided with the plurality of pour holes 1740 and the central hole 1737, as previously described above. As an example, the top structure may also be provided with an interior surface ("interior surface," "top interior") 1722, as shown. The plurality of through holes 1740 may thus extend from the interior surface 1722 to the top surface (1612A in FIG. 16), as an example. As shown, the top portion 1712 may comprise a bottom surface or bottom diameter 1715 and a top inner recess 1742, as an example.

As shown in FIG. 17, the middle portion 1714 may comprise an interior cavity surface 1730, which may form the mold cavity of the mold, and thus structures and forms the molded object during the molding process, as an example. As will be described in greater detail herein below, the top 1712 and the bottom 1716 may also form at least a portion of the mold cavity (e.g., the top and bottom of the cavity). As shown, the middle portion 1714 may further comprise a top surface 1724 and an external ring flange 1733, as an example. As an example, when the mold 1710 is assembled, and when the top portion 1712 rests on top of the middle portion 1714, the top surface 1724 of the middle 1714 may fit snugly into the inner recess 1742 of the top 1712, and the bottom surface 1715 may rest on the external ring flange 1733. As will be discussed in greater detail below, the middle portion 1714 may be formed by the joining of two identical halves (not shown). Thus, the top structure 1712 and the external ring flange 1733 may provide structural support to the middle portion 1714, such that no mold compound leaks out of the mold 1710 during the curing process.

Figure 18A:
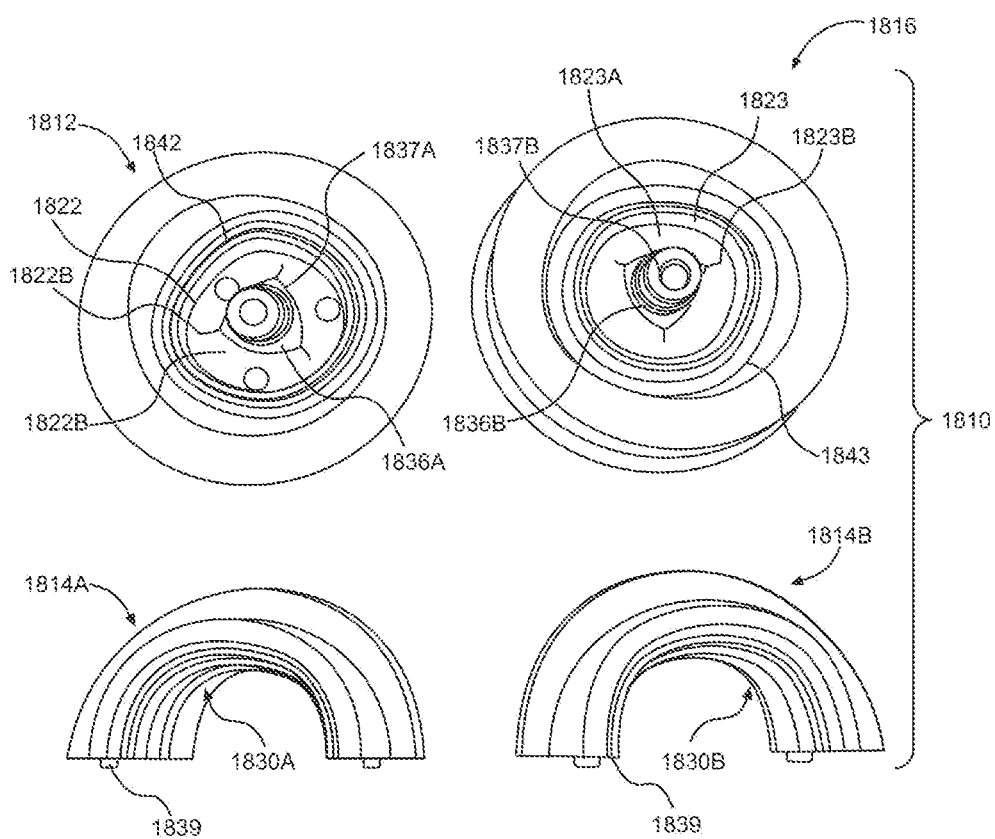
FIGS. 18A-18B illustrate a top separated view and a perspective separated view, respectively, of the top, middle, and bottom portions of the exemplary embodiment of the mold shown in FIGS. 16A-16B, according to an aspect.
Figure 18B:
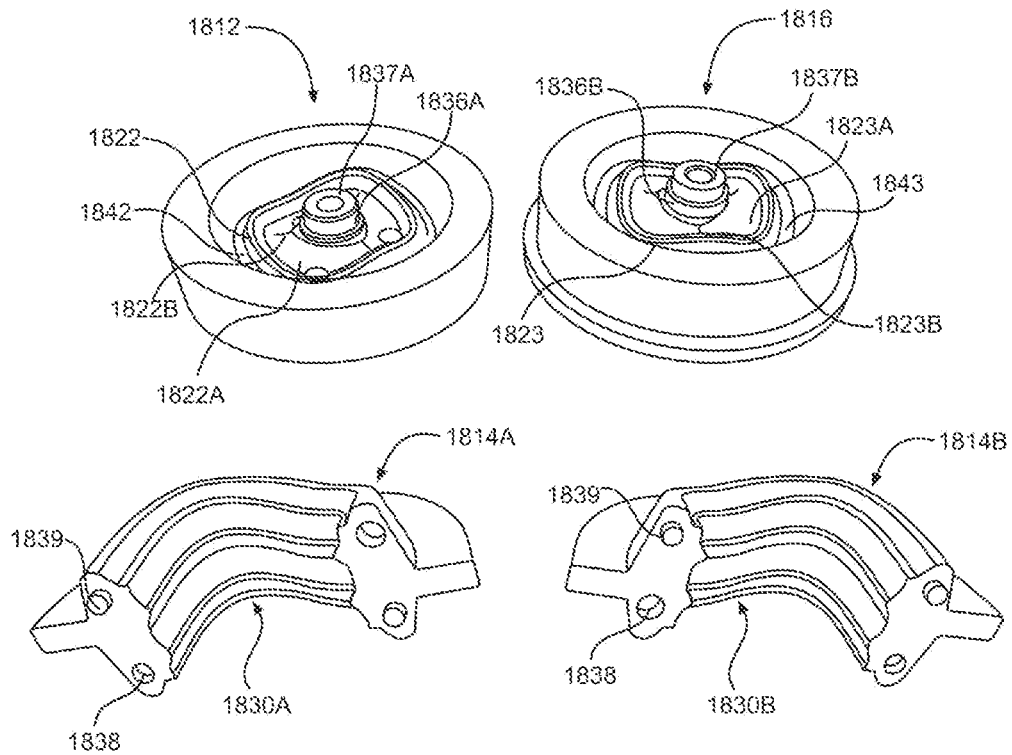

FIGS. 18A-18B illustrate a top separated view and a perspective separated view, respectively, of the top 1812, middle 1814, and bottom 1816 portions of the exemplary embodiment of the mold 1610 shown in FIGS. 16A-16B, according to an aspect. As shown in FIGS. 18A-18B, the mold 1810 may comprise four structures overall, with each structure 1812, 1814A, 1814B, 1816 fitting together to form the mold assembly for the creation of a molded object (e.g., a wheel) having a complex shape. Thus, due to the minimal number of mold components, an advantage is an improvement in manufacturing time and therefore a reduction in manufacturing costs.

As mentioned previously above, the middle structure may comprise two halves 1814A, 1814B, as shown, which, when joined together, form the middle structure. As shown in FIGS. 18A-18B, each half 1814A, 1814B may comprise a pair of connection processes 1839 and a pair of receiving holes 1838. As an example, the connection processes 1839 of the first half 1814A may be inserted into the receiving holes 1838 of the second half 1814B when the mold is assembled, and vice versa, such that the halves 1814A, 1814B are securely joined together and thus form the middle structure. As shown, each half 1814A, 1814B may comprise half of the mold cavity surface, such that when the halves 1814A, 1814B are joined, a first surface portion 1830A and a second surface portion 1830B may from a continuous mold cavity within the mold, as an example.

As shown in FIGS. 18A-18B, views of the interiors of the top structure 1812 and the bottom structure 1816 are provided. As described previously above, the top structure 1812 may be provided with a central hole (shown by 1637 in FIG. 16B) that may extend through the top surface (1612A). As shown, the top structure 1812 and the bottom structure 1816 may each comprise a half of the central hole, such that the top structure 1812 comprises a first half 1837A and the bottom 1816 comprises a second half 1837B. Thus, when the mold 1810 is assembled, the central hole (formed by 1837A and 1837B) may extend from the top 1812 through the bottom 1816, as an example. As shown, the top 1812 and bottom 1816 may also be provided with axially aligned cylinders 1836A, 1836B, which form the respective central holes 1837A, 1837B, as an example. As an example, the axially aligned cylinders 1836A, 1836B may also form a portion of the mold cavity, as will be discussed in more detail below. As an example, when the mold 1810 disclosed herein is assembled, the axially aligned cylinders 1836A, 1836B may contact each other, such that the center hole extends from the top 1812 to the bottom 1816. Additionally, when the molding compound is applied to the mold, the molded object may, due to the alignment of the axially aligned cylinders 1836A, 1836B, have a center hole. For example, if the molded object is a skateboard wheel, the center hole may thus be a center bore hole, which may then be retrofitted with an axle for the skateboard wheel to be mounted to the skateboard.

As shown in FIGS. 18A-18B, the top structure 1812 may comprise the interior surface 1822, as similarly mentioned previously. As shown, the top interior surface 1822 may be nonuniform, such that the surface quality is not flat, for example. The interior surface 1822 may be provided with a plurality of top depressions, defined by a plurality of peaks 1822B and a plurality of troughs 1822A, as shown, such that the surface quality follows a sinewave shape concentrically about the center hole 1837A. As shown, the pour holes (shown by 1740 in FIG. 17) may be disposed within each trough 1822A in the interior surface 1822, as an example. As such, when the top portion 1812 is assembled on top of the connected halves 1814A, 1814B, and when the assembled mold 1810 is provided with the mold compound (e.g., polyurethane), the interior surface 1822 may form the top of the mold cavity, such that the top of the molded object is defined by the peaks 1822B and the troughs 1822A of the interior surface 1822, as an example. As an example, if the molded object is a skateboard wheel, the interior surface 1822 may shape a first outermost surface of the skateboard wheel (i.e., the wheel disc or spokes).

Similarly, as shown, the bottom structure 1816 may comprise an interior surface 1823 and a bottom inner recess 1843 surrounding the interior surface 1823, as an example. As shown, the interior surface 1823 and the inner recess 1843 may also be nonuniform, such that the surface quality is not flat, as better shown in FIG. 18B. The bottom interior surface 1823 may be provided with a plurality of bottom indentations, defined by a plurality of peaks 1823B and a plurality of troughs 1823A, as shown, which may both coincide with the plurality of peaks 1822B and the plurality of troughs 1822A of the top interior surface 1822, as an example. The surface qualities of the bottom interior surface 1823 and inner recess 1843 may thus also follow a sinewave shape concentrically about the center hole 1837B, as shown as an example. As such, when the mold 1810 is assembled, and the connected halves 1814A, 1814B sit atop the bottom portion 1816, and when the mold compound is provided into the assembled mold, the bottom interior surface 1823 may form the bottom of the mold cavity surface, such that the bottom of the molded object is defined by the peaks 1823B and the troughs 1823A of the bottom 1816, as an example. As an example, if the molded object is a skateboard wheel, the interior surface 1823 may shape a second outermost surface of the skateboard wheel, opposite the first outermost surface mentioned above. As shown in FIGS. 18A-18B as an example, the interior surfaces 1822, 1823 of the top 1812 and the bottom 1816, respectively, may be nearly identical in shape and configuration, except for the presence of the pour holes (1740 in FIG. 17) in the top 1812.

As mentioned previously above, the mold 1810 may comprise a minimal number of structural components, thus making assembly of the mold fairly straightforward and time efficient. Additionally, because of the easily separable nature of the top 1812, middle 1814A, 1814B, and bottom 1816 structures of the mold, a molded object may thus easily be demolded (i.e., removed) after curing. As an example, after the mold compound (e.g., polyurethane) has been poured into the mold through the pour holes (e.g., 1740 in FIG. 17) and has hardened, the top portion 1812 may be removed from the mold assembly (e.g., as in FIG. 17). Then, a user may remove the middle structure (joined halves 1814A and 1814B) from the bottom portion 1816, such that the molded object is kept intact within the middle structure. Finally, the user may disjoin the first half 1814A from the second half 1814B, such that the molded object is completely removed from the mold and is thus demolded (bodies separated as in FIG. 18A, for example). Thus, an advantage is that, compared to current demolding methods, because less time may be spent demolding the molded object, manufacturing costs may be reduced. Additionally, because of the ease of demolding, no springs or slides need to be placed on the mold to facilitate removal of the molded object from the mold, as an example.

Figure 19:
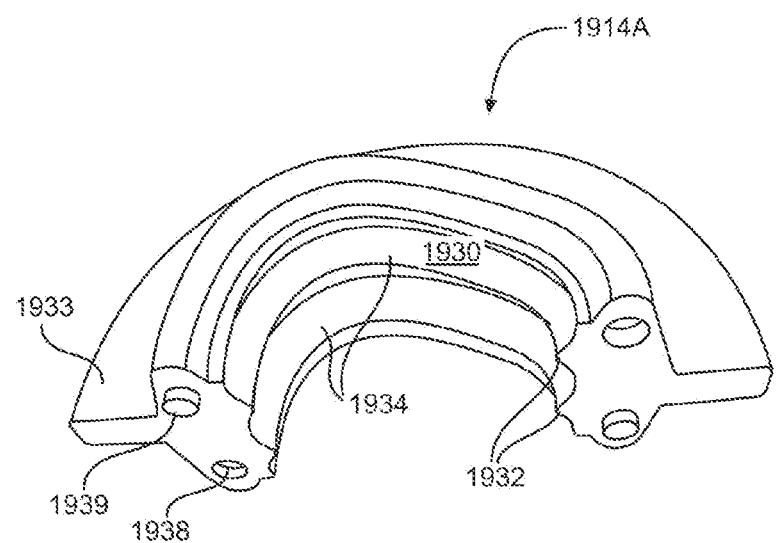
FIG. 19 illustrates a perspective separated view of the middle portions of the exemplary embodiment of the mold shown in FIGS. 18A-18B, according to an aspect.
Figure 19:
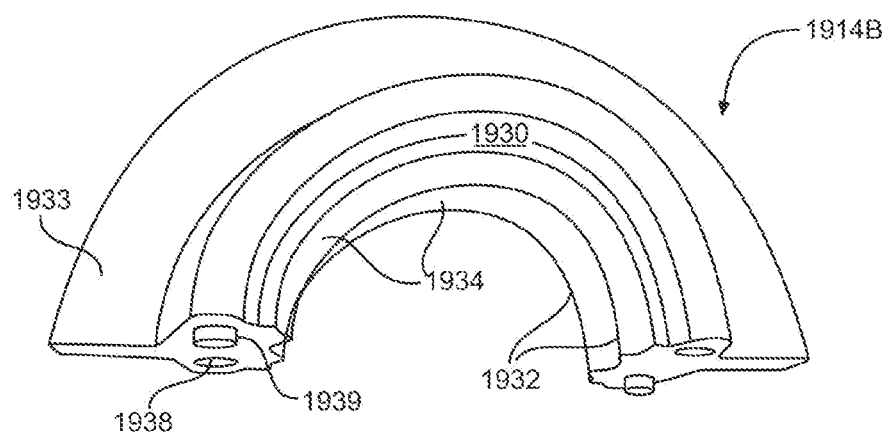

FIG. 19 illustrates a perspective separated view of the middle portions 1914A, 1914B of the exemplary embodiment of the mold 1810 shown in FIGS. 18A-18B, according to an aspect. As described previously above when referring to FIGS. 18A-18B, the middle portions 1914A, 1914B may, when joined together, help form the mold cavity. As an example, the mold cavity may define the outer exterior definition of the molded object; in the case of a wheel, the mold cavity 1930 may define the shape of the rim or barrel. As shown in FIG. 19, the mold cavity surface 1930 may comprise a plurality of channels 1934 defined by a plurality of protrusions 1932. The plurality of protrusions 1932 may concentrically line the mold cavity surface 1930, such that the plurality of channels 1934 are disposed periodically along the mold cavity surface 1930 of the middle portions 1914A, 1914B, which thus causes the creation of the non-uniform surface quality, as shown. In this example, let the plurality of protrusions 1932 be two protrusions, such that the plurality of channels 1934 is three channels, as shown. As shown as an example, each of the plurality of protrusions 1932 may be sinewave shaped, such that each adjacent channel 1934 is also sinewave shaped. Thus, as an example, the mold cavity may create a molded object having a complex shape, such as a skateboard wheel having three successive sinewave shaped channels, for example. Additionally, as an example, the skateboard wheel formed by the exemplary mold described herein and shown in FIGS. 16A-19 may be smaller than the longboard wheel formed by the exemplary mold shown in FIGS. 12A-15.

As previously mentioned herein above, the halves 1914A, 1914B of the middle portion may each be provided with the exterior ring flange 1933, as shown in FIG. 19. As an example, during the molding process, as the molding compound cures, the molding compound may expand within the mold. The exterior ring flange 1933 may provide a necessary structural restraining force against the expansion forces exerted as the curing of the molded object occurs, as an example, since the top portion (e.g., 1812 in FIG. 18A) sits atop the exterior ring flange 1933. Thus, no molding compound may leak out of the mold during the curing process.

As mentioned above, the two halves 1914A, 1914B may be identical and may comprise the same exemplary components and configurations (e.g., channels 1934), as shown. Because each half 1914A, 1914B is configured the same, no particular protocol needs to be followed when joining the two halves 1914A, 1914B together and assembling the mold, as an example. In other words, the two halves 1914A, 1914B may be joined together with 1914A positioned on the left side or on the right side (via a top view), for example. Additionally, when the mold is assembled, the middle structure (formed by the two halves 1914A, 1914B) may be placed onto the bottom structure (e.g., 1816 in FIG. 18A) "upside-down," as opposed to the particular arrangement shown in FIG. 16, for example. In other words, for example, the top surface (1624 in FIG. 16) of the middle structure (1614) can be placed into the bottom structure (e.g., 1816 in FIG. 18A), such that the top surface (1624) contacts the bottom recess (1843). Thus, because of the great flexibility in regard to the order of assembling the mold and/or the positioning of the halves of the middle structure, as opposed to the mold shown in FIGS. 1-5, the possibilities for mistakes occurring during the molding process are greatly reduced. Thus, an advantage is that the flexibility of the placement of the mold structures may allow for a nearly error-free molding process, and thus an increase in molding efficiency.

As an example, the mold (1610), including each of its components and structures, may be constructed of any suitably durable material like metal (e.g., steel, aluminum), such that to allow the mold to be structurally supported and the mold cavity kept intact during the molding process. Additionally, although the mold is described herein above as having a generally cylindrical outer surface (1618), it should be understood that other shapes and arrangements are also possible (e.g., conical), so long as the middle structure is structurally supported such that the halves are sealed together. It should also be understood that each structure of the mold may be constructed to be a shape other than circular, e.g., rectangular, depending on the needs (e.g., shape, definition) of the molded object to be produced by the mold cavity. It should be noted that although the top structure is depicted as having a plurality of pour holes for applying mold compound to the mold, the top structure may be configured to have a singular pour hole (e.g., center hole) for the applying the mold compound.

As an example, the mold embodiments described above and shown in FIGS. 11A-19 may also be provided with a center rod or pin, as described, and shown in FIGS. 10A-10B, for example. Referring back to FIGS. 10A-10B, the center pin (1025) may be inserted into the center hole (e.g., 1237, 1637) of the latter mold embodiments (e.g., 1210, 1610). As an example, the top pushbutton (e.g., 1052) of the center pin (1025) may be engaged, as similarly discussed previously, such that the center pin locks into the bottom body (e.g., 1216, 1616). In particular, the bottom pin (1053) disposed in the bottom (1035) of the center pin (1025) may protrude, when the top pushbutton is engaged, such that the bottom pin (1053) interlocks within the axially aligned cylinder (e.g., 1436B) of the bottom body (e.g., 1416), as an example. As discussed previously when referring to FIG. 10 above, utilization of the central pin (1025) may ensure that the molded object is concentric about a vertical central axis when completed. Additionally, the center pin may further help stabilize the mold (e.g., 1210) during curing, for example.

It should be understood that although the exemplary molds disclosed herein above have been described as producing molded objects like complex wheels, the molds may be adapted to form other objects as well. A person of ordinary skill in the art may recognize that the mold cavity surface within each mold need only be reshaped to produce a different type of object. The resultant reconfigured mold may still be easily assembled and disassembled, such that the above disclosed advantages are still maintained. It should also be understood that the halves of the middle structure of each exemplary mold disclosed herein above may be adapted to be joined via means other than the connection processes and receiving holes, as described. As an example, each half of the middle structure may be provided with slits and corresponding tabs for slidingly engaging each half together, such that the halves are joined and sealed together.

It may be advantageous to set forth definitions of certain words and phrases used in this patent document. The term "couple" and its derivatives refer to any direct or indirect communication between two or more elements, whether or not those elements are in physical contact with one another. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Further, as used in this application, "plurality" means two or more. A "set" of items may include one or more of such items. Whether in the written description or the claims, the terms "comprising," "including," "carrying," "having," "containing," "involving," and the like are to be understood to be open-ended, i.e., to mean including but not limited to. Only the transitional phrases "consisting of" and "consisting essentially of," respectively, are closed or semi-closed transitional phrases with respect to claims.

The phrase "molding process," as used in this application, generally refers to and includes the assembling of the mold disclosed herein above, the gravity pouring of mold compound into the mold, the curing of the mold compound such that a molded object is formed, and the demolding of the molded object from the mold.

If present, use of ordinal terms such as "first," "second," "third," etc., in the claims to modify a claim element does not by itself connote any priority, precedence or order of one claim element over another or the temporal order in which acts of a method are performed. These terms are used merely as labels to distinguish one claim element having a certain name from another element having a same name (but for use of the ordinal term) to distinguish the claim elements. As used in this application, "and/or" means that the listed items are alternatives, but the alternatives also include any combination of the listed items.

Throughout this description, the aspects, embodiments or examples shown should be considered as exemplars, rather than limitations on the apparatus or procedures disclosed or claimed. Although some of the examples may involve specific combinations of method acts or system elements, it should be understood that those acts and those elements may be combined in other ways to accomplish the same objectives.

Acts, elements and features discussed only in connection with one aspect, embodiment or example are not intended to be excluded from a similar role(s) in other aspects, embodiments or examples.

Aspects, embodiments or examples of the invention may be described as processes, which are usually depicted using a flowchart, a flow diagram, a structure diagram, or a block diagram. Although a flowchart may depict the operations as a sequential process, many of the operations can be performed in parallel or concurrently. In addition, the order of the operations may be re-arranged. With regard to flow- charts, it should be understood that additional and fewer steps may be taken, and the steps as shown may be combined or further refined to achieve the described methods.

If means-plus-function limitations are recited in the claims, the means are not intended to be limited to the means disclosed in this application for performing the recited function, but are intended to cover in scope any equivalent means, known now or later developed, for performing the recited function.

If any presented, the claims directed to a method and/or process should not be limited to the performance of their steps in the order written, and one skilled in the art can readily appreciate that the sequences may be varied and still remain within the spirit and scope of the present invention.

Although aspects, embodiments and/or examples have been illustrated and described herein, someone of ordinary skills in the art will easily detect alternate of the same and/or equivalent variations, which may be capable of achieving the same results, and which may be substituted for the aspects, embodiments and/or examples illustrated and described herein, without departing from the scope of the invention. Therefore, the scope of this application is intended to cover such alternate aspects, embodiments and/ or examples. Hence, the scope of the invention is defined by the accompanying claims and their equivalents. Further, each and every claim is incorporated as further disclosure into the specification.

What is claimed is:

1. A mold for molding a single object having a complex shape, the mold comprising:
   a top, middle, and bottom bodies, said bodies having peripheral walls, and defining a vertical central axis and an inside cavity surface having same vertical central axis, when said bodies are in mutual contact; and
   a center pin adapted to be attached to a center of the bottom body, the center pin extending from the center up through a center hole in the top body, and aligning with the vertical central axis, when attached;
   the inside cavity surface comprising:
      a plurality of protrusions disposed horizontally along a medial portion of the inside cavity surface; and
      a plurality of channels disposed horizontally along the medial portion;
      wherein the plurality of protrusions and the plurality of channels are each wave- shaped;
   wherein, in the presence of a molding compound, the inside cavity surface defines the complex shape of the single object being molded within the mold.

2. The mold of claim 1, wherein the middle body further comprises two separate portions, such that, when abutting, the two separate potions form the medial portion of the inside cavity surface.

3. The mold of claim 1, wherein the center pin comprises a top pushbutton, the top pushbutton causing an interlocking of the center pin with the center of the bottom body when engaged.

4. The mold of claim 1, wherein the top body rests on the middle body, and the middle body rests on the bottom body, thereby aligning the inside cavity surface with the vertical central axis.

5. The mold of claim 1, wherein the peripheral walls comprise a top, a middle, and a bottom wall portions, said wall portions being concentric about the vertical axis.

6. The mold of claim 1, wherein each channel of the plurality of channels is formed between two adjacent protrusions of the plurality of protrusions.

7. The mold of claim 6, wherein the plurality of protrusions is five protrusions.

8. The mold of claim 7, wherein the plurality of channels is four channels.

9. A mold for molding a single object having a complex shape, the mold comprising:
- a top, middle, and bottom bodies, said bodies having peripheral walls, and defining a vertical central axis and an inside cavity surface having same vertical central axis, when said bodies are in mutual contact; and
- at least one axially aligned cylinder disposed centrally within the top body, the at least one axially aligned cylinder comprising a central hole, and aligning with the vertical central axis;
- the inside cavity surface comprising:
  - a first plurality of depressions disposed vertically in an upper portion of the inside cavity surface;
  - at least one protrusion disposed horizontally along a medial portion of the inside cavity surface;
  - at least one channel disposed horizontally along the medial portion; and
  - a second plurality of depressions disposed vertically in a lower portion of the inside cavity surface;
  - wherein the at least one protrusion and the at least one channel are wave-shaped;
- wherein, in the presence of a molding compound, the inside cavity surface defines the complex shape of the single object being molded within the mold.

10. The mold of claim 9, further comprising at least two pour holes disposed in the top body, the at least two pour holes joining a top surface of the top body with the upper portion of the inside cavity surface.

11. The mold of claim 9, wherein the first and the second pluralities of depressions of the inside cavity surface are concentric about the vertical central axis.

12. The mold of claim 9, wherein the at least one axially aligned cylinder is two axially aligned cylinders, the second axially aligned cylinder being disposed centrally within the bottom body, such that to contact and align with the first axially aligned cylinder.

13. The mold of claim 12, wherein the two axially aligned cylinders have facing center holes.

14. The mold of claim 9, wherein the at least one protrusion is two protrusions and at least one channel is three channels.

15. The mold of claim 9, wherein the top body rests on the middle body, and the middle body rests on the bottom body, thereby aligning the inside cavity surface with the vertical central axis.

16. A mold comprising:
- a top, middle, and bottom bodies, said bodies having peripheral walls, and defining a vertical central axis, when said bodies are in mutual contact;
- the middle body comprising two separate halves that are identical in shape, and which, when abutted, form an inside cavity surface having the same vertical central axis;
- wherein the inside cavity surface comprises:
  - at least one protrusion disposed horizontally along the inside cavity surface;
  - at least one channel disposed horizontally along the inside cavity surface, the at least one channel being adjacent to the at least one protrusion; and
  - wherein the at least one protrusion and the at least one channel are wave shaped;
- wherein, in the presence of a molding compound, the inside cavity surface defines at least a portion of a shape of an object being molded within the mold.

17. The mold of claim 16, further comprising a center hole disposed centrally in a top surface of the top body, the center hole aligning with the vertical central axis.

18. The mold of claim 16, wherein the top body rests on the middle body, and the middle body rests on the lower body, thereby aligning the inside cavity surface with the vertical central axis.

19. The mold of claim 16, wherein the peripheral walls comprise a top, a middle, and a bottom wall portions, said wall portions being concentric about the vertical central axis.

* * * * *